(12) United States Patent
Singh

(10) Patent No.: US 11,176,712 B2
(45) Date of Patent: Nov. 16, 2021

(54) SYSTEM AND METHOD FOR SELECTING SCENES FOR BROWSING HISTORIES IN AUGMENTED REALITY INTERFACES

(71) Applicant: PCMS Holdings, Inc., Wilmington, DE (US)

(72) Inventor: Mona Singh, Cary, NC (US)

(73) Assignee: PCMS Holdings, Inc., Wilmington, DE (US)

( * ) Notice: Subject to any disclaimer, the term of this patent is extended or adjusted under 35 U.S.C. 154(b) by 0 days.

(21) Appl. No.: 16/477,148

(22) PCT Filed: Jan. 16, 2018

(86) PCT No.: PCT/US2018/013915
§ 371 (c)(1),
(2) Date: Jul. 10, 2019

(87) PCT Pub. No.: WO2018/136438
PCT Pub. Date: Jul. 26, 2018

(65) Prior Publication Data
US 2019/0355153 A1 Nov. 21, 2019

Related U.S. Application Data

(60) Provisional application No. 62/447,632, filed on Jan. 18, 2017, provisional application No. 62/447,638, filed on Jan. 18, 2017.

(51) Int. Cl.
*G09G 5/00* (2006.01)
*G06T 11/00* (2006.01)
*H04L 29/08* (2006.01)
(52) U.S. Cl.
CPC .............. *G06T 11/00* (2013.01); *H04L 67/22* (2013.01)

(58) Field of Classification Search
CPC .......... G06F 3/011; G06F 3/012; G06F 3/013; G06T 19/006; G06K 9/00671; H04N 13/366; H04L 67/22
See application file for complete search history.

(56) References Cited

U.S. PATENT DOCUMENTS 8,941,689 B2 1/2015 Fein
9,087,058 B2 7/2015 Neven
(Continued)

FOREIGN PATENT DOCUMENTS

| CN | 105808071 | 7/2016 |
|----|-----------|--------|
| CN | 106033333 | 10/2016 |
| EP | 2887231 A1 | 6/2015 |

OTHER PUBLICATIONS

International Search Report and Written Opinion of the International Searching Authority for PCT/US2018/013915 dated May 11, 2018.
(Continued)

*Primary Examiner* — Hau H Nguyen
(74) *Attorney, Agent, or Firm* — Invention Mine LLC

(57) ABSTRACT

Information may be provided for review by an augmented reality (AR) user. A system may store a plurality of scenes viewed by the AR user, and for each scene information identifying (i) any pairs of real-life objects and AR augmentations presented in the scene and (ii) any pairs in the scene with which the user interacted. The system may also select from the stored plurality of scenes a first subset of scenes such that each pair with which the user interacted is presented in at least one scene in the first subset of scenes. Responsive to an instruction from the user to review historical AR information, the system may present to the user the selected first subset of scenes. The first subset may be selected such that each pair with which the user interacted is
(Continued)

presented in at least one scene in which the user interacted with that pair.

20 Claims, 20 Drawing Sheets

(56) References Cited

U.S. PATENT DOCUMENTS

| | | | |
|---|---|---|---|
| 2008/0147325 | A1 | 6/2008 | Maassel |
| 2011/0122137 | A1 | 5/2011 | Wang |
| 2014/0036097 | A1* | 2/2014 | Sexton ................ G06T 11/60 348/207.1 |
| 2015/0120616 | A1 | 4/2015 | Sullivan |
| 2015/0235267 | A1* | 8/2015 | Steube ............. H04N 21/4223 705/14.58 |
| 2018/0108079 | A1* | 4/2018 | Traub ................ G06Q 30/0643 |
| 2019/0114061 | A1* | 4/2019 | Daniels .................. G06F 15/16 |

OTHER PUBLICATIONS

Correia N. et al: "HyperMem: A System to Store and Replay Experiences in Mixed Reality Worlds", 2005 International Conference on Cyberworlds IEEE Computer Society, Nov. 23, 2005 (Nov. 23, 2005), pp. 83-92, XP010889365, DOI: 10.1109/CW.2005.52, ISBN: 978-0-7695-2378-1.

Ponto K. et al: "Effective Replays and Summarization of Virtual Experiences", IEEE Transactions on Visualization and Computer Graphics, IEEE Service Center, vol. 18, No. 4, Apr. 1, 2012 (Apr. 1, 2012), pp. 607-616, XP011490415, ISSN: 1077-2626, DOI: 10.1109/TVCG.2012.41.

Wikipedia, "Set Cover Problem". Wikipedia web article, available at: https://en.wikipedia.org/w/index.php?title=Set_cover_problem &oldid=751393251, modified on Nov. 25, 2016, 4 pages.

Pokémon, "Pokémon Go". Web Archive dated Nov. 18, 2016, available at: http://web.archive.org/web/20161118221141/https://www.pokemongo.com/en-us/pokemon/, 2 pages.

Mura, D., et al., "Augmented Reality: Fusing the Real and Synthetic Worlds". IEEE International Geoscience and Remote Sensing Symposium, (2012), pp. 170-173.

"Augment Desktop [NEW]—Augment Help Center". Web Archive dated Dec. 19, 2019, available at: https://web.archive.org/web/20161219125525/http://www.augment.com/help/category/augment-desktop, 2 pages.

Lloyd, C., "Layar AR App Updates with Redesign and New History Feed". Retrieved from https://www.slashgear.com/layar-ar-app-updates-with-redesign-and-new-history-feed-15293824/, Aug. 15, 2013, 2 pages.

International Preliminary Report on Patentability for PCT/US2018/013915 dated Jul. 23, 2019, 6 pages.

"Augmented Reality Apps". Web Archive dated Dec. 20, 2016, available at: https://web.archive.org/web/20161220104805/http://www.augment.com/augmented-reality-apps/, 2 pages.

"Augmented Desktop: Solutions for 3D Models in Augmented Reality". Web Archive dated, Jan. 1, 2017, available: https://web.archive.org/web/20170101132513/http://www.augment.com/technology/augment-desktop, 2 pages.

* cited by examiner

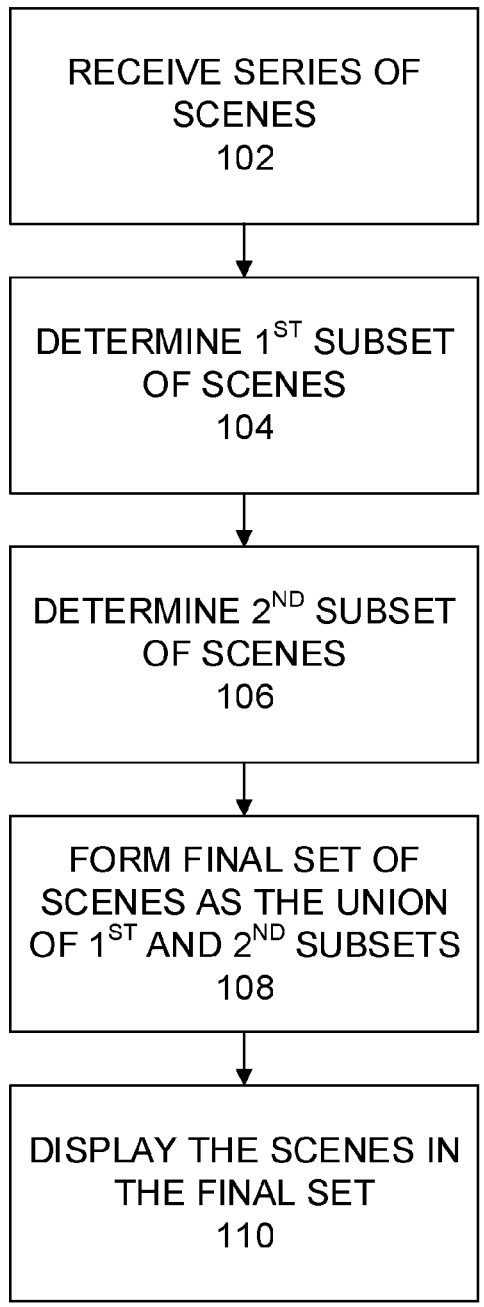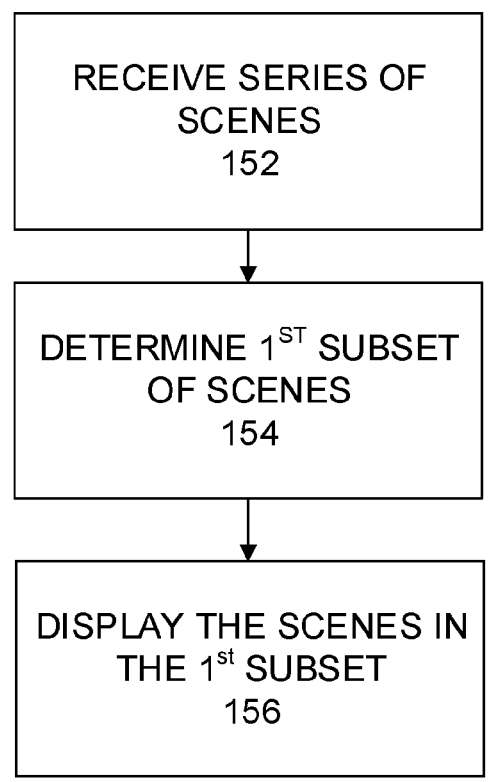
FIG. 1A
FIG. 1B

```
S9
D, E, F, I,
L, M, N
```

Iteration 1 Result: D, E, F, I, L, M, N

```
S9              S20
D, E, F, I,     B, F, G,
L, M, N         H, K
```

Iteration 2 Result: B, D, E, F, G, H, I, K, L, M, N

```
S9              S20             S5
D, E, F, I,     B, F, G,        A, C, H, O
L, M, N         H, K
```

Iteration 3 Result: A, B, C, D, E, F, G, H, I, K, L, M, N, O

```
S9              S20             S5              S15
D, E, F, I,     B, F, G,        A, C, H, O      D, E, J, S
L, M, N         H, K
```

Iteration 4 Result: A, B, C, D, E, F, G, H, I, J, K, L, M, N, O, S

```
S9              S20             S5              S15             S16
D, E, F, I,     B, F, G,        A, C, H, O      D, E, J, S      R, S, T
L, M, N         H, K
```

Iteration 5 Result: A, B, C, D, E, F, G, H, I, J, K, L, M, N, O, R, S, T

```
S9              S20             S5              S15             S16             S11
D, E, F, I,     B, F, G,        A, C, H, O      D, E, J, S      R, S, T         I, P, Q
L, M, N         H, K
```

Iteration 6 Result: A, B, C, D, E, F, G, H, I, J, K, L, M, N, O, P, Q, R, S, T

FIG. 10

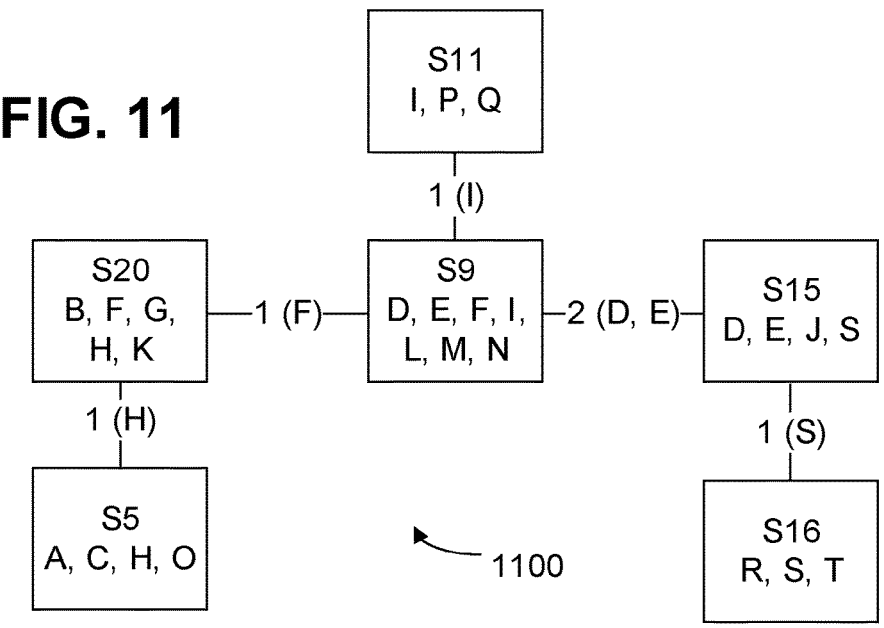

| <-2, 0> S5 A, C, H, O # | <-1, 0> S20 B, F, G, H, K $ # | <0, 1> S11 I, P, Q @ | | | |
|---|---|---|---|---|---|
| | | <0, 0> S9 D, E, F, I, L, M, N % ^ $ @ | <1, 0> S15 D, E, J, S % ^ & | <2, 0> S16 R, S, T & |

FIG. 22

SYSTEM AND METHOD FOR SELECTING SCENES FOR BROWSING HISTORIES IN AUGMENTED REALITY INTERFACES

CROSS-REFERENCE TO RELATED APPLICATIONS

The present application is a national stage application under 35 U.S.C. 371 of International Application No. PCT/US2018/013915, entitled "SYSTEM AND METHOD FOR SELECTING SCENES FOR BROWSING HISTORIES IN AUGMENTED REALITY INTERFACES," filed on Jan. 16, 2018, which claims benefit under 35 U.S.C. § 119(e) from U.S. Provisional Patent Application Ser. No. 62/447,632, filed Jan. 18, 2017, entitled "SYSTEM AND METHOD FOR SELECTING SCENES FOR BROWSING HISTORIES IN AUGMENTED REALITY INTERFACES", and U.S. Provisional Patent Application Ser. No. 62/447,638, filed Jan. 18, 2017, entitled "SYSTEMS AND METHODS FOR SUMMARIZING AND ORGANIZING HISTORICAL AUGMENTED REALITY INFORMATION", each of which is incorporated herein by reference in its entirety.

TECHNICAL FIELD

This disclosure relates to systems and methods for augmented reality. More specifically, this disclosure relates to systems and methods for user history interfaces for augmented reality.

BACKGROUND

When a user is utilizing augmented reality (AR) technology, browsing histories of AR information that a user has experienced is mainly limited to web browser metaphors. In a typical web browser, a user can go "Back" to a previous page either sequentially or by viewing the entire list of available pages in a history view. The history may be grouped and summarized by time periods (e.g., in the last day, week) and the history may be searched for keywords in a web page's address or title.

In an AR setting, a user may go through a period of time in which multiple scenes, some containing AR information, are presented. Each AR information item is presented in some scene that the user sees, and more than one AR information item may be presented in some scenes that a user sees. The same AR information may also be presented in multiple different scenes, and the user may interact with some AR information items in some of the scenes, but not in others.

A user may wish to reexamine some of the AR information, for example because the user wishes to look closely at some AR information item that was previously encountered. In this regard, the scene in which the AR information item occurred assists in jogging the user's memory. In addition, if the user interacted with some AR information item in one or more scenes, then a scene in which the user interacted with that item may be more salient because the users personal interaction with that item in that scene may better remind the user of what was useful or not useful about that AR information item.

In some scenarios, an AR scene is presented every thirty seconds, giving approximately one thousand scenes in an eight hour period. Many of those scenes would include the same AR information items. For this reason, it is important to reduce the number of scenes to be presented to the user while providing the information the user may use to be reminded of previously experienced AR information items.

SUMMARY

Systems and methods are set forth herein for providing information for review by an AR user. In one embodiment, a method comprises: storing a plurality of scenes viewed by an AR user; storing for each of the plurality of scenes information identifying (i) any pairs of real-life objects and AR augmentations presented in the scene and (ii) any pairs in the scene with which the user interacted; selecting from the stored plurality of scenes a first subset of scenes such that each pair with which the user interacted is presented in at least one scene in the first subset of scenes; and responsive to an instruction from the user to review historical AR information, presenting to the user the selected first subset of scenes. The first subset may in some embodiments be a minimum size subset such that each interacted-pair is presented in at least one scene in which the user interacted with that pair.

Systems and methods described herein are also provided for providing information for review by an AR user, the method comprising: storing information regarding a first plurality of scenes encountered by the user, the information comprising information regarding augmentations presented in each scene and augmentations with which a user interaction was detected; determining a first subset of the first plurality of scenes comprising a minimum number of scenes in which all augmentations with which the user interacted are represented; and responsive to input from the user related to review of historical AR information, presenting information regarding the first subset of the first plurality of scenes comprising a minimum number of scenes in which all augmentations with which the user interacted are represented.

In some exemplary embodiments described herein, a user views historical AR information in a manner that i) summarizes the AR information, thereby reducing the amount of information; ii) is complete in that it includes at least on instance of each AR information item that was presented to the user; iii) is memory supporting, in that it presents any AR information item in some scene in which the user originally saw the AR information item; and iv) is interaction sensitive in that an AR information item that a user interacted with is presented in some scene in which the user originally interacted with it.

Systems and methods described herein are also provided for summarizing and organizing historical AR information, the method comprising: displaying a first geometric shape annotated with information regarding a first scene of a first plurality of scenes; and displaying a plurality of second geometric shapes annotated with information regarding a plurality of additional scenes of the first plurality of scenes such that: i) each additional scene is a scene in which at least one object was presented which was also presented in the first scene; and ii) each geometric shape of the plurality of second geometric shapes is arranged in the display such that it shares an edge with the first geometric shape.

In some exemplary embodiments described herein, a user views historical AR information in a manner that i) summarizes the AR information, thereby reducing the amount of information; ii) is complete in that it includes at least on instance of each AR information item that was presented to the user; iii) is authentic, in that it presents any AR information item in at least one scene in which the user originally viewed the AR information item; and iv) is association preserving, in that the scenes are organized such that the scenes placed next to each other have one or more AR information items in common.

BRIEF DESCRIPTION OF THE DRAWINGS

A more detailed understanding may be had from the following description, presented by way of example in conjunction with the accompanying drawings in which like reference numerals in the figures indicate like elements, and wherein:

FIG. 1A depicts an example method of presenting historical AR information to a user, in accordance with some embodiments.

FIG. 1B depicts an example method of presenting historical AR information to a user, in accordance with some embodiments.

FIG. 10 depicts the results of a series of iterations of scene selections, in accordance with some embodiments.

FIG. 11 depicts an identification of root nodes, in accordance with some embodiments.

FIGS. 12A-12C depict some steps in producing a grid-based layout, in accordance with some embodiments.

FIG. 22 depicts an example table of user history in accordance with some embodiments.

The entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—may only properly be read as being constructively preceded by a clause such as "In at least one embodiment . . . " For brevity and clarity of presentation, this implied leading clause is not repeated ad nauseum in the detailed description of the drawings.

EXAMPLE DEVICE AND NETWORK FOR IMPLEMENTATION OF THE EMBODIMENTS

A wireless transmit/receive unit (WTRU) may be used as a AR display device in embodiments described herein. The AR device shown in FIG. 21A may be used as various client devices disclosed herein.

Figure 21A:
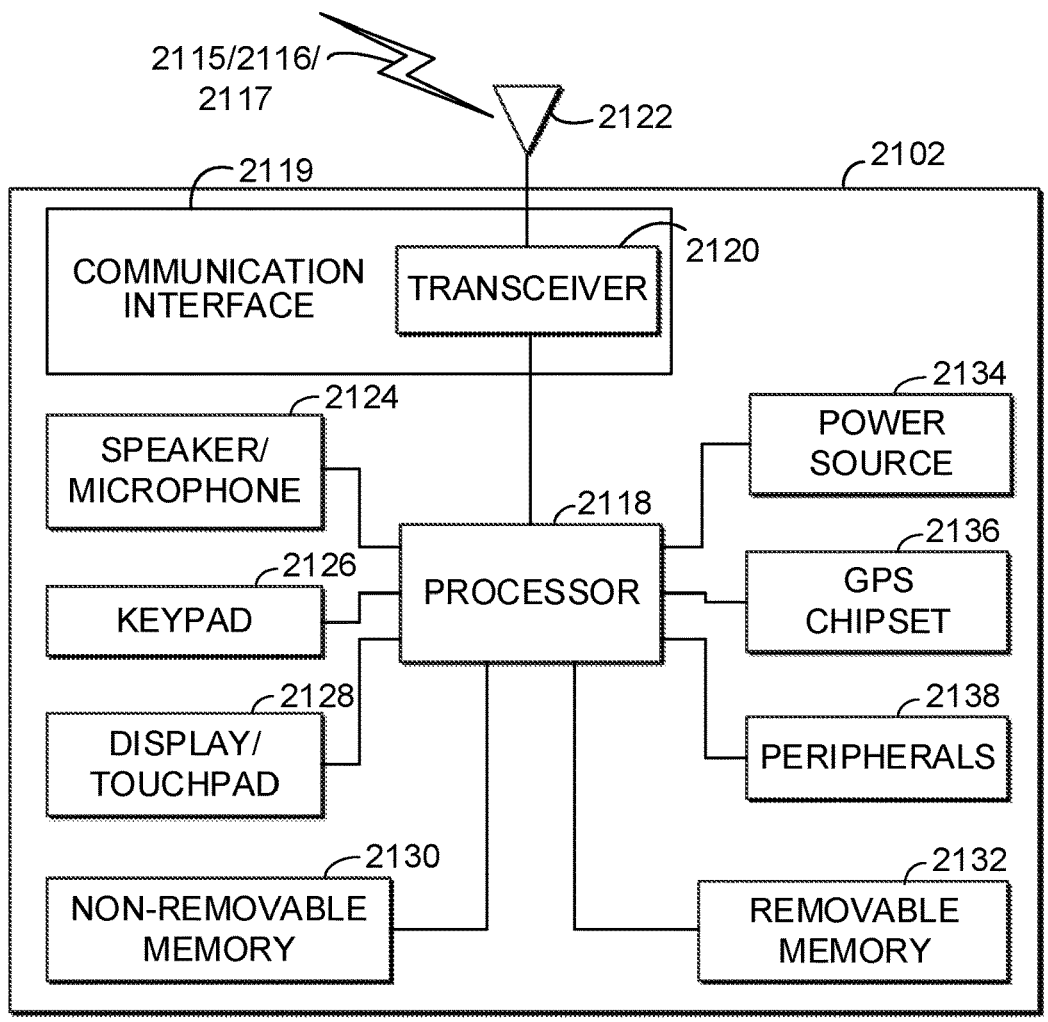
FIG. 21A is a system diagram of an example wireless transmit/receive unit (WTRU).

FIG. 21A is a system diagram of an example WTRU 2102. As shown in FIG. 21A, the WTRU 2102 may include a processor 2118, a transceiver 2120, a transmit/receive element 2122, a speaker/microphone 2124, a keypad 2126, a display/touchpad 2128, a non-removable memory 2130, a removable memory 2132, a power source 2134, a global positioning system (GPS) chipset 2136, and other peripherals 2138. The transceiver 2120 may be implemented as a component of decoder logic 2119. For example, the transceiver 2120 and decoder logic 2119 may be implemented on a single LTE or LTE-A chip. The decoder logic may include a processor operative to perform instructions stored in a non-transitory computer-readable medium. As an alternative, or in addition, the decoder logic may be implemented using custom and/or programmable digital logic circuitry.

It will be appreciated that the WTRU 2102 may include any sub-combination of the foregoing elements while remaining consistent with an embodiment. Also, embodiments contemplate that the base stations, and/or the nodes that base stations may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 21A and described herein.

The processor 2118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 2118 may perform signal coding, data processing, power control, input/output processing, and/or any other functionality that enables the WTRU 2102 to operate in a wireless environment. The processor 2118 may be coupled to the transceiver 2120, which may be coupled to the transmit/receive element 2122. While FIG. 21A depicts the processor 2118 and the transceiver 2120 as separate components, it will be appreciated that the processor 2118 and the transceiver 2120 may be integrated together in an electronic package or chip.

The transmit/receive element 2122 may be configured to transmit signals to, or receive signals from, a base station over the air interface 2116. For example, in one embodiment, the transmit/receive element 2122 may be an antenna configured to transmit and/or receive RF signals. In another embodiment, the transmit/receive element 2122 may be an emitter/detector configured to transmit and/or receive IR, UV, or visible light signals, as examples. In yet another embodiment, the transmit/receive element 2122 may be configured to transmit and receive both RF and light signals. It will be appreciated that the transmit/receive element 2122 may be configured to transmit and/or receive any combination of wireless signals.

In addition, although the transmit/receive element 2122 is depicted in FIG. 21A as a single element, the WTRU 2102 may include any number of transmit/receive elements 2122. More specifically, the WTRU 2102 may employ MIMO technology. Thus, in one embodiment, the WTRU 2102 may include two or more transmit/receive elements 2122 (e.g., multiple antennas) for transmitting and receiving wireless signals over the air interface 2116.

The transceiver 2120 may be configured to modulate the signals that are to be transmitted by the transmit/receive element 2122 and to demodulate the signals that are received by the transmit/receive element 2122. As noted above, the WTRU 2102 may have multi-mode capabilities. Thus, the transceiver 2120 may include multiple transceivers for enabling the WTRU 2102 to communicate via multiple RATs, such as UTRA and IEEE 802.11, as examples.

The processor 2118 of the WTRU 2102 may be coupled to, and may receive user input data from, the speaker/microphone 2124, the keypad 2126, and/or the display/touchpad 2128 (e.g., a liquid crystal display (LCD) display unit or organic light-emitting diode (OLED) display unit). The processor 2118 may also output user data to the speaker/microphone 2124, the keypad 2126, and/or the display/touchpad 2128. In addition, the processor 2118 may access information from, and store data in, any type of suitable memory, such as the non-removable memory 2130 and/or the removable memory 2132. The non-removable memory 2130 may include random-access memory (RAM), read-only memory (ROM), a hard disk, or any other type of memory storage device. The removable memory 2132 may include a subscriber identity module (SIM) card, a memory stick, a secure digital (SD) memory card, and the like. In other embodiments, the processor 2118 may access information from, and store data in, memory that is not physically located on the WTRU 2102, such as on a server or a home computer (not shown).

The processor 2118 may receive power from the power source 2134, and may be configured to distribute and/or control the power to the other components in the WTRU 2102. The power source 2134 may be any suitable device for powering the WTRU 2102. As examples, the power source 2134 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 2118 may also be coupled to the GPS chipset 2136, which may be configured to provide location information (e.g., longitude and latitude) regarding the current location of the WTRU 2102. In addition to, or in lieu of, the information from the GPS chipset 2136, the WTRU 2102 may receive location information over the air interface 2116 from a base station and/or determine its location based on the timing of the signals being received from two or more nearby base stations. It will be appreciated that the WTRU 2102 may acquire location information by way of any suitable location-determination method while remaining consistent with an embodiment.

The processor 2118 may further be coupled to other peripherals 2138, which may include one or more software and/or hardware modules that provide additional features, functionality and/or wired or wireless connectivity. For example, the peripherals 2138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 21B:
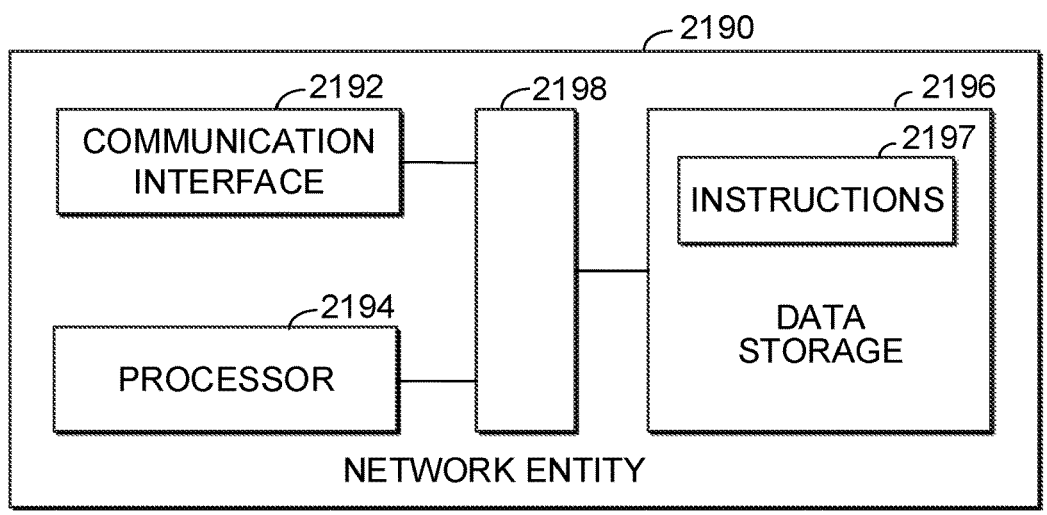
FIG. 21B depicts an example network entity that may be used to communicate with a WTRU.

FIG. 21B depicts an example network entity 2190 that may be used to communicate with the communication system 2102 of FIG. 21A. The network entity 2100 may also act as different cloud based services disclosed herein and communicate with different client devices, such as an AR display. As depicted in FIG. 21B, the network entity 2190 includes a communication interface 2192, a processor 2194, and non-transitory data storage 2196, all of which are communicatively linked by a bus, network, or other communication path 2198.

Communication interface 2192 may include one or more wired communication interfaces and/or one or more wireless-communication interfaces. With respect to wired communication, communication interface 2192 may include one or more interfaces such as Ethernet interfaces, as an example. With respect to wireless communication, communication interface 2192 may include components such as one or more antennae, one or more transceivers/chipsets designed and configured for one or more types of wireless (e.g., LTE) communication, and/or any other components deemed suitable by those of skill in the relevant art. And further with respect to wireless communication, communication interface 2192 may be equipped at a scale and with a configuration appropriate for acting on the network side—as opposed to the client side—of wireless communications (e.g., LTE communications, Wi Fi communications, and the like). Thus, communication interface 2192 may include the appropriate equipment and circuitry (which may include multiple transceivers) for serving multiple mobile stations, UEs, or other access terminals in a coverage area.

Processor 2194 may include one or more processors of any type deemed suitable by those of skill in the relevant art, some examples including a general-purpose microprocessor and a dedicated DSP.

Data storage 2196 may take the form of any non-transitory computer-readable medium or combination of such media, some examples including flash memory, read-only memory (ROM), and random-access memory (RAM) to name but a few, as any one or more types of non-transitory data storage deemed suitable by those of skill in the relevant art may be used. As depicted in FIG. 21B, data storage 2196 contains program instructions 2197 executable by processor 2194 for carrying out various combinations of the various network-entity functions described herein.

In some embodiments, the network-entity functions described herein are carried out by a network entity having a structure similar to that of network entity 2190 of FIG. 21B. In some embodiments, one or more of such functions are carried out by a set of multiple network entities in combination, where each network entity has a structure similar to that of network entity 2190 of FIG. 21B. In various different embodiments, network entity 2190 is—or at least includes—one or more of (one or more entities in) RANs, (one or more entities in) core networks, one or more base stations, Node Bs, RNCs, an MGW, an MSC, a SGSN, a GGSN, one or more eNode Bs, an MME, a serving gateway, a PDN gateway, an ASN gateway, a MIP HA, and an AAA. Certainly other network entities and/or combinations of network entities may be used in various embodiments for carrying out the network-entity functions described herein, as the foregoing list is provided by way of example and not by way of limitation.

DETAILED DESCRIPTION

A detailed description of illustrative embodiments will now be provided with reference to the various Figures. Although this description provides detailed examples of possible implementations, it should be noted that the provided details are intended to be by way of example and in no way limit the scope of the application.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

In some embodiments described herein, a user may view historical AR information in a manner that summarizes the AR information to reduce the amount of information presented, while still including any AR information items with which the user interacted.

In some embodiments described herein, a user views historical AR information in a manner that i) summarizes the AR information, thereby reducing the amount of information; ii) is complete in that it includes at least one instance of each AR information item that was presented to the user; iii) is memory supporting, in that it presents any AR information item in some scene in which the user originally saw the AR information item; and iv) is interaction sensitive in that an AR information item that a user interacted with is presented in some scene in which the user originally interacted with it.

In some embodiments, a user is presented with a compact historical view that i) shows all AR information items that the user interacted with in at least one of the scenes where the user interacted with them; ii) shows all remaining AR information items in at least one of the scenes where they were originally presented to the user; and iii) uses an optimal number of scenes to present these AR information items.

In some embodiments, historical AR information is selected and organized by summarizing the AR information, thereby reducing the amount of information. The selected historical AR information is complete, in that it includes at least one instance of each AR information item that was presented to the user and is also authentic, in that it presents each AR information item in at least one scene in which the user originally viewed that AR information item. The selected historical AR information may, in some embodiments, be association preserving in that scenes are organized such that scenes placed next to each other have one or more AR information items in common. A user may benefit from associations between scenes in terms of the AR information items those scenes have in common. That is, it would help the user to see the scenes in a manner that highlights their associations, so the user can quickly identify a scene that contains a desired AR information item.

In one embodiment, a compact historical view is presented that shows all AR information items in at least one of the scenes where they were originally presented to the user. Sufficient scenes are selected to present all the AR information items presented to the user. A thumbnail is generated for each of the selected scenes, and these thumbnails are positioned so that scenes with overlapping AR information items are shown associated with (e.g., adjacent to) each other.

Aspects of a web browser history view may not be applicable to presenting histories of AR scenes. For example, a web page in a browsers history is visited by an explicit action of the user. It contains some content that was created by someone with a purpose and contains links to other web pages. There is a URL or title that summarizes a web page, as in an entry for that page in the browser history. However, the scene presented in an AR interface contains a somewhat arbitrary mix of real-life objects (depends on where the user happens to look and what objects move into or out of the users view). As a result, unlike for a web page, there is not a URL or title that summarizes a scene. That is, it is beneficial for the user to visualize the scene (analogous to web page content) to know what is in the scene.

Further, when a user interacts with any part of a web page by performing some action (such as clicking a link or a button) that action typically results in a new page (or part of a page, e.g., a frame) being presented to the user—meaning that the interaction of the user could be recorded in the history.

In contrast, when a user interacts with an AR information item, the physical scene that the user is viewing may not change, so the interaction by itself does not lead to an altered path in the history, as it does for web browsing. Unlike for a web browser, where a visited page enters the history because of a user interaction, a user may be presented a new AR information item, or pair, without specifically interacting with that item or pair. For example, a beacon may cause an AR information item to be presented to the user based on the users proximity to the beacon, but the user may not interact with the presented AR information item.

Web browser history approaches do not tackle the idea of presenting histories in a way that respects the granularity of the components (e.g., frames, pictures, or tables) of a web page, which is a challenge for AR. This is because in a web page, the components are tightly integrated (e.g., the text may describe a picture). As a result, showing the same picture in one page versus another page may make a substantial difference in meaning. That is, pages cannot arbitrarily be chosen to summarize the history without altering the meaning.

In contrast, in AR, there is no associated "text" that links to a real-life object (except whatever is captured in the AR information item). Real-life objects occur together because of the nature of the environment (i.e., the real world). Unlike the contextual scenario of a web page, if the user needs to view a real-life object and its associated AR information item, then as long as the user sees the same object and the same (or similar) AR information item, the user's need is satisfied. Human perception and cognition are geared through evolution for "object permanence"—thus, a user can recognize and attach a meaning to the same real-life object in more than one setting. This point of difference is an opportunity for AR because it enables optimization in summarizing a history that, in general, may not be intuitive for web browsing.

In some embodiments, the term "pair" refers to a real-life object and an associated AR information item. The same real-life object may feature in more than one pair, i.e., with different AR information items (as might occur when multiple AR apps pick up the same real-life object). The same pair may occur in more than one scene. The user may or may not have interacted with a pair. In some embodiments, the term "interacted-pair" refers to a pair where the user has interacted with its AR information item. In some embodiments, the term "non-interacted-pair" refers to a pair where the user has not interacted with its AR information item.

In some embodiments, the term "scene" refers to a view presented (e.g., as an image rendering of a point cloud) to the user that contains at least one pair, whether or not the user has interacted with any pair. In some embodiments, the term "interacted-scene" refers to a scene that contains at least one interacted-pair that the user interacted with in that scene. In some embodiments, the term "non-interacted-scene" refers to a scene that is not an interacted-scene (e.g., a scene that does not contain at least one interacted-pair).

In some embodiments, the term "root" or "root node" refers to a node in a tree identified as central. The terms parent, child, sibling, leaf, and descendant may be used to describe relations between different nodes. For any edge on a path from the root to another node, the endpoint of the edge closer to the root is the parent and the endpoint of the edge farther from the root is the child. Two children of the same parent (i.e., along different edges) are referred to as siblings. A node with no children is referred to as a leaf, and a descendant of a node is its child, its child's child, and so on.

In some embodiments, the term "thumbnail" refers to a scaled down version of one scene or of a composite of two or more sibling scenes. Each thumbnail identifies the pairs of any scenes it summarizes.

Selecting Scenes for Browsing Histories in Augmented Reality Interfaces

FIG. 1A depicts an exemplary method of presenting historical AR information to a user, in accordance with some embodiments. In particular, FIG. 1A depicts the method 100 that includes receiving a series of scenes at 102, producing a first subset of scenes at 104, producing a second subset of scenes at 106, forming a final set of scenes as the union of the first and second subsets at 108, and displaying the scenes in the final set of scenes at 110.

A series of scenes may be received (102). In some embodiments, each received scene is associated with a list of any pairs in that scene, as well as a sub-list of any interacted-pairs in that scene. In some embodiments, rather than a list of pairs (if any) for each received scene, there is a single received list that associates each received scene with any pairs in that scene, and also indicates any interacted-pairs in each received scene. In some embodiments, the received scenes may be chronologically sorted, with the most recent scenes first. In some embodiments, chronological data about the received scenes, such as a time stamp for a scene, is also received and stored, such that the scenes may later be chronologically sorted.

A first subset of scenes may be determined that includes (e.g., covers) all interacted-pairs (104). In some embodiments, the first subset of scenes is determined such that each interacted-pair, across all received scenes, is an interacted-pair in at least one of the scenes in the first subset of scenes. In some embodiments, the first subset may be a minimum size set.

A second subset of scenes may also be determined, which includes (e.g., covers) any non-interacted-pairs not covered by the first subset of scenes (106). In some embodiments, from the received scenes, list(s) of pairs, and sub-list(s) of any interacted-pairs, a list of non-interacted-pairs in each received scene may be determined. In one embodiment, from the list of non-interacted-pairs in each scene and the first subset of scenes, a group of non-interacted-pairs that are not covered by the first subset may be determined. The second subset of scenes may be determined such that each pair in the group of non-interacted-pairs not covered by the first subset is present in at least one of the scenes in the second subset of scenes. In some embodiments, the second subset may be a minimum size set. In some embodiments, no interacted-scenes are included in the second subset. In some embodiments, interacted-scenes may be included in the second subset.

In some embodiments, a final set of scenes may be formed as a union of the first and second subsets of scenes (108). This final set of scenes may then be displayed (110). In some embodiments, the final set of scenes may be displayed in an order in which they occur in the received series of scenes (e.g., receipt order, chronologically, etc.).

The method 100 computes a summary AR history for presentation to a user that brings back scenes the user previously saw, so that the user may be familiar with them. It shows each pair in a scene where user saw the pair, and additionally may show each interacted-pair in a scene where the user interacted with it. In some embodiments, a minimal-size set of scenes is determined given these constraints.

FIG. 1B depicts an example method of presenting historical AR information to a user, in accordance with some embodiment embodiments. In particular, FIG. 1B depicts the method 150 that includes receiving a series of scenes at 152, determining a first subset of scenes at 154, and displaying the scenes in the first subset at 156. In some embodiments, the method 150 may operate similarly to the method 100. As in the method 100, the first subset of scenes may be determined (152) that includes (e.g., covers) all interacted-pairs. In some embodiments, the first subset of scenes is determined such that each interacted-pair, across all received scenes, is an interacted-pair in at least one of the scenes in the first subset of scenes. In some embodiments, the first subset may be a minimum size set.

In one embodiment, a methods for providing information for review by an AR user comprises: storing a plurality of scenes viewed by an AR user; storing for each of the plurality of scenes information identifying (i) any pairs of real-life objects and AR augmentations presented in the scene and (ii) any pairs in the scene with which the user interacted; selecting from the stored plurality of scenes a first subset of scenes such that each pair with which the user interacted is presented in at least one scene in the first subset of scenes; and responsive to an instruction from the user to review historical AR information, presenting to the user the selected first subset of scenes. The first subset may in some embodiments be a minimum size subset such that each interacted-pair is presented in at least one scene in which the user interacted with that pair.

Figure 2:
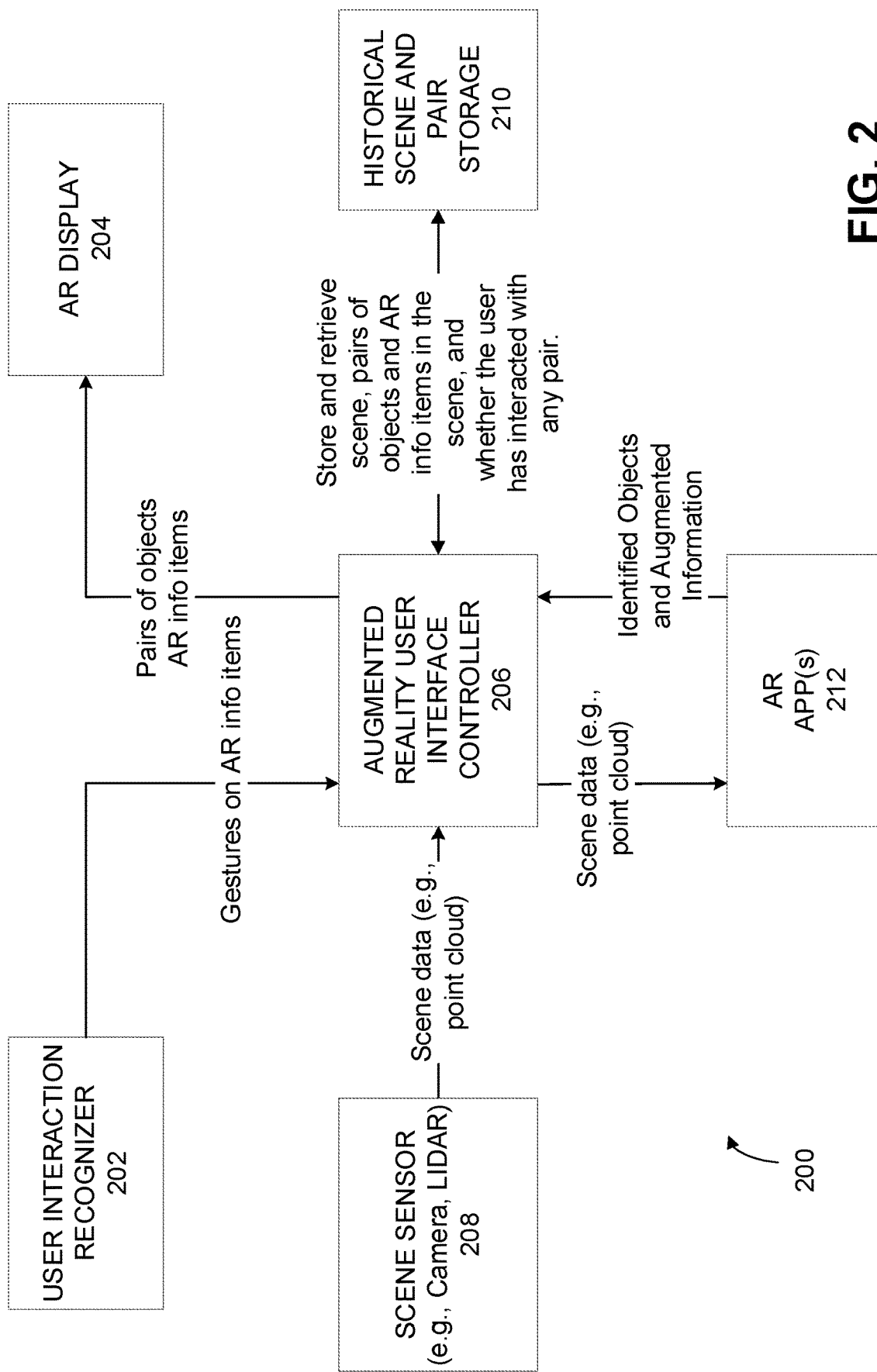
FIG. 2 depicts a system architecture, in accordance with some embodiments.

FIG. 2 depicts a system architecture, in accordance with some embodiments. In particular, FIG. 2 depicts the system 200 that includes a user interaction recognizer (UIR) 202, an AR display 204, an AR user interface (UI) controller 206, a scene sensor 208, historical scene and pair storage 210, AR application(s) 212, and associated communication connections.

The AR display 204 can present an augmented view to the user. One or more scene sensors 208 capture information about a scene (e.g., scene data). In some embodiments, the scene sensors may comprise a still camera or a video camera, and a scene may be represented by one or more still images and/or by a clip of video. In some embodiments, the scene sensors may comprise a radar, LiDAR, or other similar sensors. In some embodiments, the information captured by the scene sensors may comprise a point cloud. In some embodiments, the scene sensors may also include a location sensor (e.g., GPS, compass, etc.). The scene sensor(s) 208 may communicate captured scene data to the AR UI controller 206.

The AR UI controller 206 supports at least two modes of operations. In a first mode, the AR UI controller 206 selects and presents AR information items to the user. In addition, it provides scene and AR information items, along with pairs and information indicating whether the user interacted with each respective pair, to the historical scene and pair storage 210. In a second mode, a history mode, the AR UI controller 206 retrieves a part of the historical scenes, pairs, and user interactions from the historical scene and pair storage 210. It may determine a subset (such as a minimal subset) of historical scenes that includes all pairs presented to the user and all pairs that the user interacted with by taking a union of two subsets. The first subset of scenes may comprise scenes where the user interacted with at least one pair, and may also be a minimal subset of interacted-scenes such that each interacted-pair is included in at least one scene where the user interacted with that interacted-pair. The second subset of scenes may be a subset (such as a minimal subset) of all received scenes including non-interacted-pairs that were presented to the user. In some embodiments, the second subset may include all non-interacted-pairs, and in some embodiments the second subset may include only non-interacted-pairs that are not included in the scenes of the first subset of scenes. The historical scenes in the subsets may be presented through the AR display 204. The AR UI controller 206 also supports additional user interaction with these historical scenes (e.g., selecting historical scenes to review). The AR UI controller 206 may enter the history mode based on a user input, a determination that the user was confused, and/or the like.

AR applications 212, which may be implemented or controlled by third parties, may comprise applications on the users AR device, and/or the like. These applications 212 may be configured to receive at least some information about a given scene (e.g., scene data captured by the scene sensor(s) 208, including location data where appropriate) from the AR UI controller 206, and return to the AR UI controller 206 pairs of real-life objects and AR information items. In some embodiments, a real-life object (identified using, for example, its location coordinates, image, and boundary) may be "tagged" with a unique identifier. This unique identifier may permit the system to identify the same real-life object in different scenes. In some embodiments, the system may maintain or access a database of unique identifiers. In some embodiments, the unique identifiers may be determined by looking up a real-life object in an image database (e.g., different views of a building would be directed to the same database entry and identifier). An AR information item may provide information related to the associated real-life object, and describe how to render that information in an AR display 204.

In some embodiments, the AR UI controller 206 may not receive explicit pairs of real-life objects and AR information items, but rather sufficient information to obtain a specific pair of a real-life object and an AR information item. For example, an AR application 212 may receive scene data from the AR UI controller 206 and return a link to an AR information item (e.g., URL) and a coordinate location in the given scene. From such information, the AR UI controller 206 may retrieve the AR information item by following the link, and identify the real-life object by analyzing the scene data (e.g., object identification by image processing and selecting object at the coordinates).

In some embodiments, scenes may be captured by the AR UI controller when, for a given segment of scene data, at least one pair of a real-life object and an AR information item is received by the AR UI controller, such as from one or more AR applications. In some embodiments, new scenes are only captured when there is a change in pairs presented to the user by the AR system. In some embodiments, there is a minimum time period between captured scenes (e.g., 30 seconds, 1 minute, 10 seconds, etc.). In some embodiments, scene data is only captured when a user has settled their view on a scene for a threshold time period (e.g., 5 seconds, 10 seconds, 3 seconds, 20 seconds, etc.). In some embodiments, scene data is captured after a threshold movement by the user is detected (e.g., user turns 90 degrees, user walks 10 meters, etc.).

The various modules and components of the system 200 may be implemented on a user device or a cloud service. In one embodiment, the AR display 204, the scene sensor 208, and the UIR 202 are components of a users computing device, and the AR application(s) 212 are a cloud-based service, and the AR UI controller 206 and the historical scene and pair storage 210 may be either cloud based or on the user device, in whole or in part.

The UIR 202 recognizes a user interacting with a pair in an AR scene. It may also be configured to accept other user requests, such as recalling a history and the like. Different interactions may be detected, such as a user dwelling on or otherwise indicating an AR information item, based on detection of eye gaze, gestures, speech, and/or the like by the UIR 202. A user may have read the AR information item, seen a video, opened a link via a gesture, and/or the like to register a user interaction with a pair.

In some embodiments, two or more pairs may be substantially similar (e.g., real-life objects are different entrances for a museum or store but AR objects are the same, etc.). In such embodiments, the system may determine that the two or more pairs are sufficiently similar such that only one of the two or more pairs can or should be presented to the user in a compact historical view. In some embodiments, the real-life object portions of two pairs having the same AR portion may be sufficiently similar for the system to treat the pairs as being the same for historical review purposes. In some embodiments, the AR portions of two pairs having the same real-life object portion may be sufficiently similar for the system to treat the pairs as being the same for historical review purposes. In some embodiments, two pairs may not share either a real-life object portion or an AR portion, but both portions may be sufficiently similar for the system to treat the pairs as being the same for historical review purposes.

Figure 3:
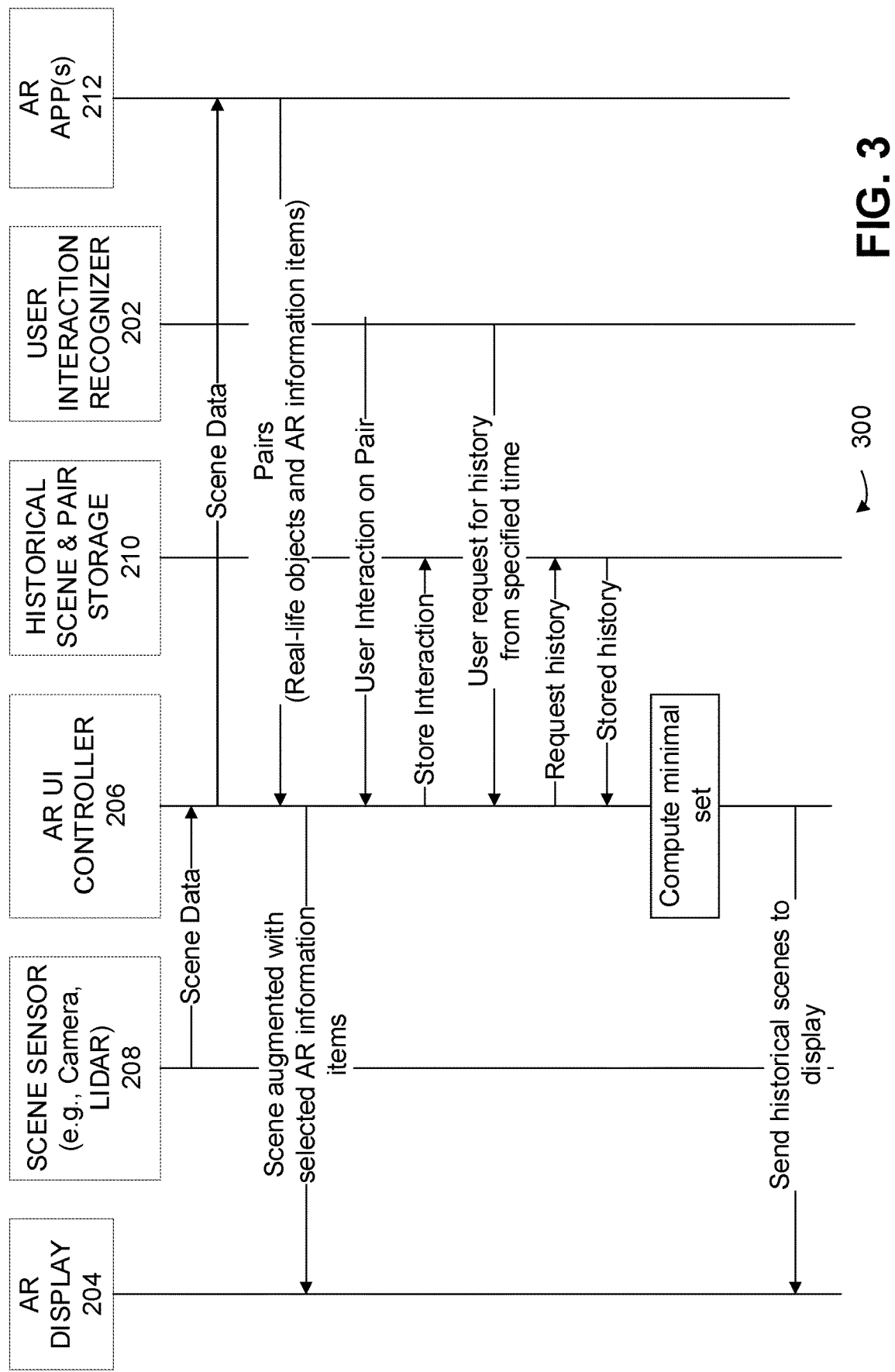
FIG. 3 depicts a sequence diagram depicting interactions between different modules, in accordance with some embodiments.

FIG. 3 depicts a sequence diagram of a sequence of interactions 300 between different modules of the system 200 of FIG. 2, in accordance with some embodiments. In the sequence 300, the scene sensor 208 provides scene data to the AR UI controller 206, which forwards the scene data to the AR application(s) 212. The AR application(s) 212 provides pairs of real-life objects and AR information items (or sufficient identifying information of pairs), to the AR UI controller 206. The AR UI controller 206 provides the AR display 204 with data to display an augmented scene with the selected AR information items. The UIR 202 detects a user's interaction with a pair in an AR scene, and provides the detection data to the AR UI controller 206, which sends the detection data to the historical scene and pair storage 210.

The UIR 202 detects a user request to view history from a specified time, and forwards the request to the AR UI controller 206. The AR UI controller requests the history (scene, pairs, and interactions) from the historical scene and pair storage 210 and responsively receives the history. The AR UI controller may compute a minimal set of historical scenes and provides the historical scenes to the AR display 204.

In some embodiments, the scenes of an AR history (e.g., final set of scenes, first subset of scenes, second subset of scenes, etc.) may be presented by the AR display 204 concurrently. In some embodiments, the scenes of an AR history may be presented by the AR display sequentially. In some embodiments, the scenes of an AR history may be displayed by the AR display as a video sequence. In some embodiments, the scenes of an AR history may be displayed not by an AR display, but on a display screen of another computing device of the user (e.g., images of the scenes on a display of a mobile phone, via a virtual reality device, etc.).

Figure 4:
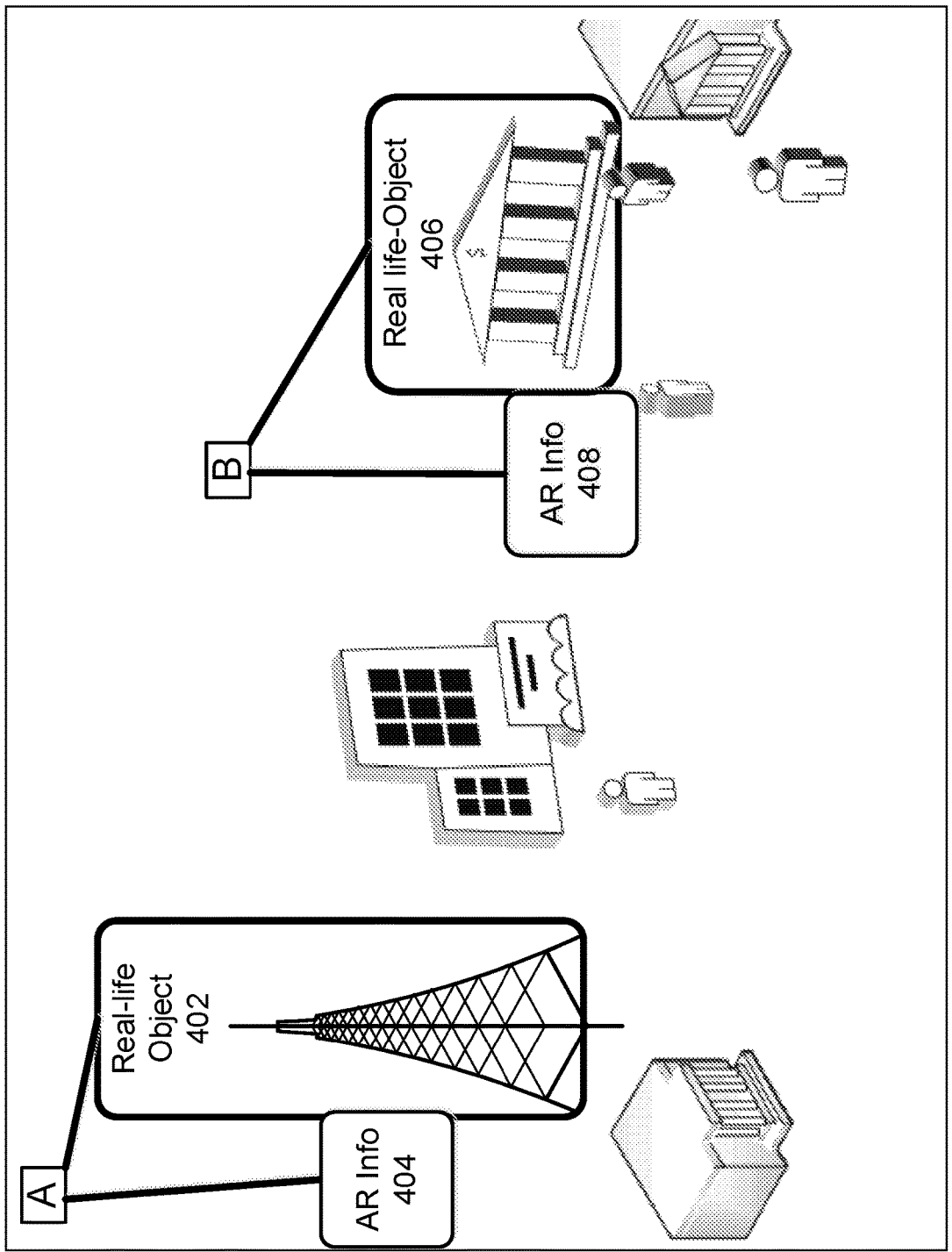
FIG. 4 depicts an AR scene in accordance with some embodiments.

FIG. 4 depicts an exemplary AR scene 400 in accordance with some embodiments. The scene 400 includes Pair A that includes a first real-life object 402 and an associated AR information item 404, and Pair B that includes a second real-life object 406 and its associated AR information item 408. The scene 400 is provided to illustrate multiple pairs of real life objects and associated AR information items being displayed in an AR scene. However, an AR scene may include any number of pairs (including none).

An exemplary scenario using a method as set forth above is discussed in relation to Tables 1-4. A first subset of scenes 104, as in method 100 of FIG. 1A, may be determined. Table 1 includes a list of received scenes, all pairs in the received scenes, and interacted-pairs in the scenes, for example as received at 102 of method 100. Table 1 also includes the non-interacted-pairs in the scenes, which may in some embodiments be received by a system and in other embodiments determined by a system from the received scenes and pair information. Here, as shown in Table 1, the received scenes are scenes S1 to S20, which varyingly include pairs A through T. Some of the pairs are indicated as having been interacted with in particular scenes. For example, if scene 400 of FIG. 4 correlates to the scene S1 in Table 1, then S1 includes pairs A and B, of which pair A is an interacted-pair.

TABLE 1

| RECEIVED SCENES AND PAIR DATA | | | Non-interacted-pairs |
|---|---|---|---|
| Scene | All pairs | Interacted-pairs | (received or determined) |
| S1 | A, B | A | B |
| S2 | A, E | | A, E |
| S3 | B, C, D | B, C | D |
| S4 | F, G, H | | F, G, H |
| S5 | A, C, H, O | A, C | H, O |
| S6 | I | | I |
| S7 | A, D, E, F, I | A, D, E | F, I |
| S8 | L, M | | L, M |

TABLE 1-continued

| RECEIVED SCENES AND PAIR DATA | | | Non-interacted-pairs |
|---|---|---|---|
| Scene | All pairs | Interacted-pairs | (received or determined) |
| S9 | D, E, F, I, L, M, N | D, E, F | I, L, M, N |
| S10 | I, O | | I, O |
| S11 | I, P | | I, P |
| S12 | A, F, P | A, F | P |
| S13 | P, Q | | P, Q |
| S14 | R | | R |
| S15 | D, E, J, S | D, E | J, S |
| S16 | R, S, T | | R, S, T |
| S17 | B, D, E, K, S | B, D, E | K, S |
| S18 | K | | K |
| S19 | A, E | | A, E |
| S20 | B, F, G, H, K | B, F | G, H, K |

As shown in Table 2, starting from the group of interacted-scenes {S1, S3, S5, S7, S9, S12, S15, S17, S20}, in some embodiments a first subset of received scenes comprising a minimum set of scenes covering the interacted-pairs may be determined (i.e., the set of scenes {S5, S15, S20} in Table 2). For example, the first subset of scenes may be determined by applying to the group of interacted-scenes a solver for a minimum set of scenes to include all interacted-pairs in at least one interacted-scene. Various efficient heuristic solutions may be used for the minimum set problem which may provide practically viable approximations, and which can be applied to determine the minimum set of scenes including all interacted-pairs in at least one interacted-scene. Of note, there may be more than one minimum covering set possible (e.g., {S1, S3, S9}, {S3, S7, S20}, etc.), and alternative minimum sets may also be used. In some embodiments, to select the first subset of scenes from between multiple options of minimum sets of scenes, the total number of pairs included in the scenes of each option may be compared and an option maximizing the total number of pairs covered may be selected as the first subset of scenes.

TABLE 2

| RECEIVED SCENES AND PAIR DATA | DETERMINED FOR FIRST SUBSET OF SCENES | |
|---|---|---|
| | Interacted-pairs in | All pairs in minimum |
| Scene | Interacted-pairs in scene | minimum set of scenes to cover interacted-pairs | set of scenes to cover interacted-pairs |
| S1 | A | | |
| S3 | B, C | | |
| S5 | A, C | A, C | A, C, H, O |
| S7 | A, D, E | | |
| S9 | D, E, F | | |
| S12 | A, F | | |
| S15 | D, E | D, E | D, E, J, S |
| S17 | B, D, E | | |
| S20 | B, F | B, F | B, F, G, H, K |

With a first subset of scenes determined, a second subset of scenes may be determined as at 106 of method 100. In one embodiment, as shown in Table 3, the system may use the first subset to determine which received scenes include non-interacted-pairs that are not included in the scenes of the first subset of scenes. For example, the first subset {S5, S15, S20} as discussed in relation to Table 2 includes pairs A-H, J, K, O, and S. This leaves the group of scenes {S6, S7, S8, S9, S10, S11, S12, S13, S14, S16}, shown in Table 3, which include at least one non-interacted-pair that is not included in the scenes of the first subset.

TABLE 3

| Scene | Remaining uncovered non-interacted-pairs | Pairs in second subset (minimum covering set) |
|---|---|---|
| S6 | I | |
| S7 | I | |
| S8 | L, M | |
| S9 | I, L, M, N | I, L, M, N |
| S10 | I | |
| S11 | I, P | |
| S12 | P | |
| S13 | P, Q | P, Q |
| S14 | R | |
| S16 | R, T | R, T |

Generally, a pair that is a non-interacted-pair in one scene may be an interacted-pair in some other scene, in which case it is already included or covered in the first subset (at 104 of method 100). Additionally, a pair that is a non-interacted-pair in one scene may also be a non-interacted-pair present in a selected scene of the first subset, and already be included or covered. Table 3 shows only those scenes (i.e., S6-S14 and S16) which have remaining pairs after the selection of the group of scenes {S5, S15, S20} as the first subset.

From the scenes having remaining uncovered pairs, a second subset of scenes may be determined. In some embodiments, a determined second subset of scenes may comprise a minimum set of scenes including all pairs not covered by the first subset of scenes. In one embodiment, as in Table 3, a second subset may be the group of scenes {S9, S13, S16}. Determination of the second subset of scenes may use the same or similar methods as used for determining the first subset of scenes. For the embodiment shown in Table 3, the second subset of scenes may include scene S9 (which covers pairs I, L, M, and N), scene S13 (which covers pairs P and Q), and scene S16 (which covers pairs R and T).

The first and second subsets may be combined into a final set of scenes. Such a final set of scenes and the pairs presented in those scenes is shown in Table 4. Here, the combination of the first and second minimum covering sets may be {S5, S9, S13, S15, S16, S20}, as based on the above discussed determinations in relation to Table 2 and Table 3.

TABLE 4

| FINAL SET OF SCENES | ALL PAIRS |
|---|---|
| S5 | A, C, H, O |
| S9 | D, E, F, I, L, M, N |
| S13 | P, Q |
| S15 | D, E, J, S |
| S16 | R, S, T |
| S20 | B, F, G, H, K |

Here, the final set of scenes comprises a union of the first and second subsets as at 108 of method 100. More generally, in some embodiments the final set of scenes may be formed by evaluating all received scenes to determine a minimal set of scenes that i) shows each pair in at least one original scene where the user saw it where ii) each interacted-pair is shown in at least one original scene where the user interacted with it. The final set of scenes is provided to the AR display for presentation to the user and possibly further user interaction.

In some embodiments, the first subset of scenes and the second subset of scenes may be presented to the user separately. In some embodiments, only interacted-scenes plus scenes of the second subset having a number of pairs above some prespecified threshold may be presented to the user. For example, in one embodiment only the first subset of scenes and those scenes of the second subset of scenes having at least three uncovered non-interacted-pairs may be presented to the user. In some cases, the prespecified threshold may be varied to result in a desired number of scenes in the final set of scenes (with a minimum number of scenes equal to the number of scenes in the first subset). In some embodiments, rather than combining the first and second subsets of scenes, only interacted-pairs are utilized in selecting scenes for presentation to the user.

Figure 22:
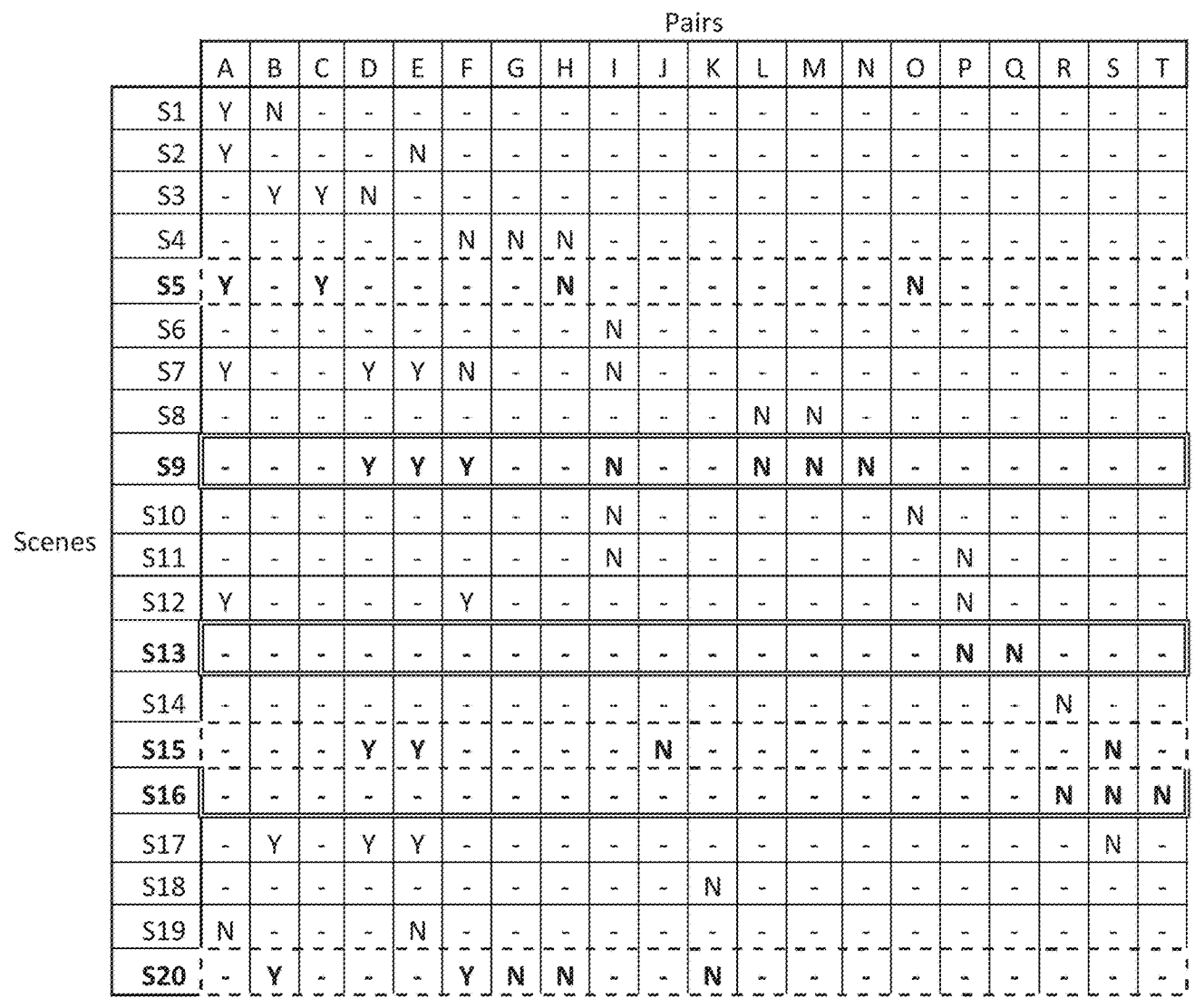

FIG. 22 illustrates an exemplary summary table of user history, in accordance with some embodiments, based on the received scenes and pair data shown in Table 1 (and operated upon in relation to Tables 2-4). FIG. 22 shows the scenes S1 through S20 in the left column and the pairs A to T in the top row. In the intersecting cells, data regarding a user interaction is indicated, with a "Y" indicating a user interacted with the pair in that scene, a "N" indicating the user did not interact with the pair in that scene, and a "-" indicating that the pair was not present or displayed in that scene. For example, the pair A was interacted with in scene S1, the pair B was not interacted with in scene S1 and the pair C was not present in scene S1. Based on the above discussion in relation to Tables 1-4, the selected scenes for the first subset {S5, S15, S20} are outlined with dashes, and the selected scenes for the second subset {S9, S13, S16} are outlined with double lines.

A presentation such as that of FIG. 22 may be used to depict the processed data of the method 100. As depicted in FIG. 22, scenes S1 through S20 were received with data regarding AR pairs A through T displayed and interacted with as indicated by "Y", "N", and "-". The pairs A through F were interacted with and a first subset (e.g., minimum covering set) comprising scenes S5, S15, and S20 is selected. After a user request to review the history, the associated pair information is displayed. For example, for scene S5 the pairs A, C, H, and 0 are selected; for scene S15 the pairs D, E, J, and S are selected; and for scene S20 the pairs B, F, G, H, and K are selected. These sets may be presented to the user, and the pairs that were interacted with by the user (pairs A through F) may be displayed differently than pairs that were not interacted with.

FIG. 22 also depicts selection of a second subset (e.g., second minimum covering set) of the first plurality of scenes comprising a minimum number of scenes in which all non-interacted-pairs not already covered by the first subset are presented. For example, in FIG. 22, the second subset of scenes, and their respective pairs include scene S9 with pairs D, E, F, I, L, M, and N; scene S13 with pairs P and Q; and scene S16 with pairs R, S, and T. These scenes and associated pairs may be presented to the user. Both the first and second subsets of scenes may be displayed concurrently to the user, or separately.

Figure 5:
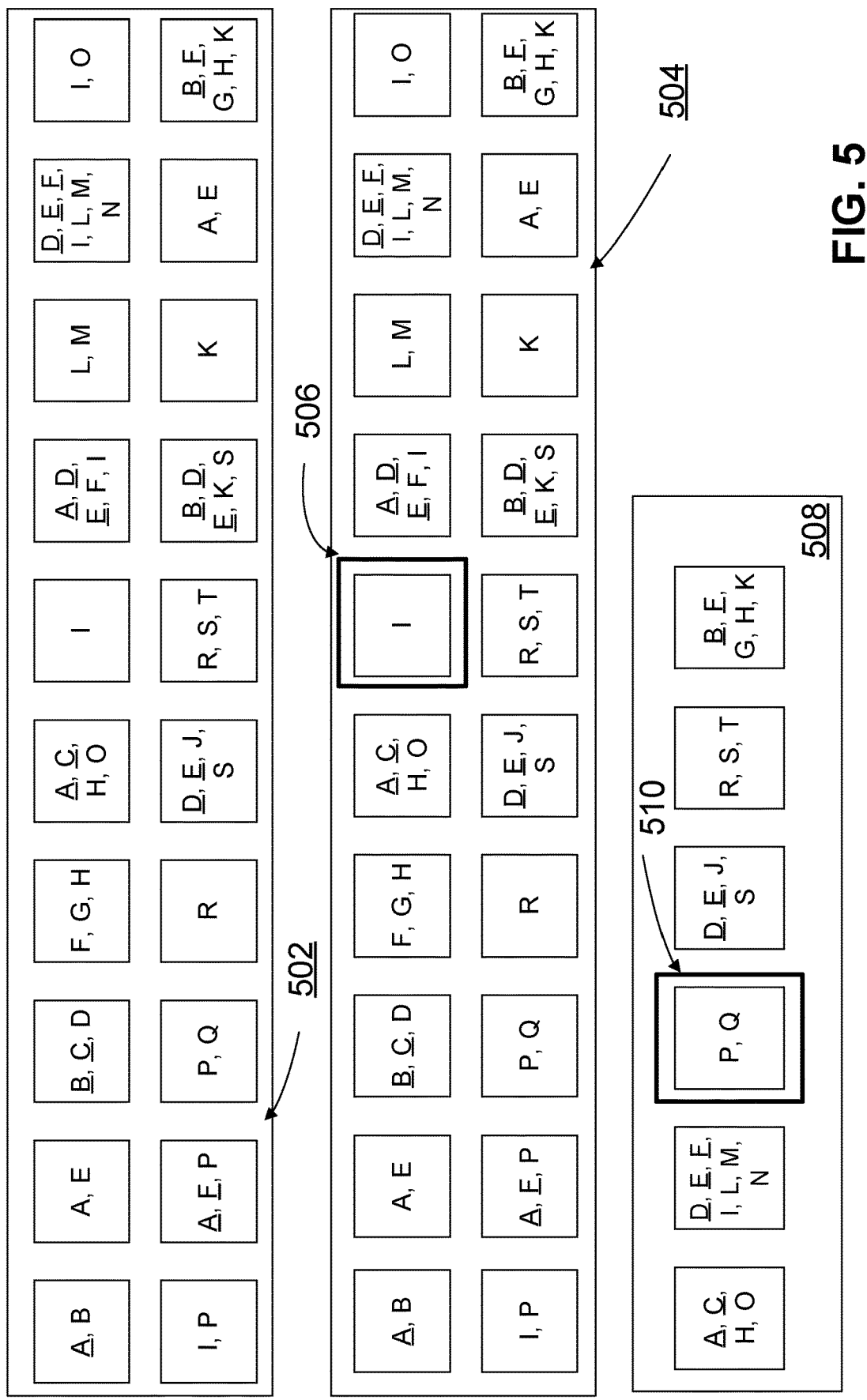
FIG. 5 depicts a first use case, in accordance with some embodiments.

FIG. 5 depicts a first use case, in accordance with some embodiments. FIG. 5 includes three sets of scenes 502, 504, and 508. The set of scenes 502 represents a set of scenes that a user experiences. Each box represents a scene, and the letters represent pairs within that scene. Underlined letters indicate pairs that the user has interacted with. The set of scenes 504 depicts a first method of viewing historical AR data for the original set of scenes 502. In the first method, the user is presented with all of the scenes experienced before, and selects a scene 506 to view, which here includes the non-interacted-pair I. The set of scenes 508 depicts a second method of viewing historical AR data. The second method may be similar to the method 100. Here, the set of scenes 508 includes six different scenes that cover all of the pairs from the scenes of original set 502. The scenes may display the interacted pairs distinctly from the non-interacted pairs. The user may also select a scene 510 to view, which here includes the non-interacted-pairs P and Q.

Figure 6:
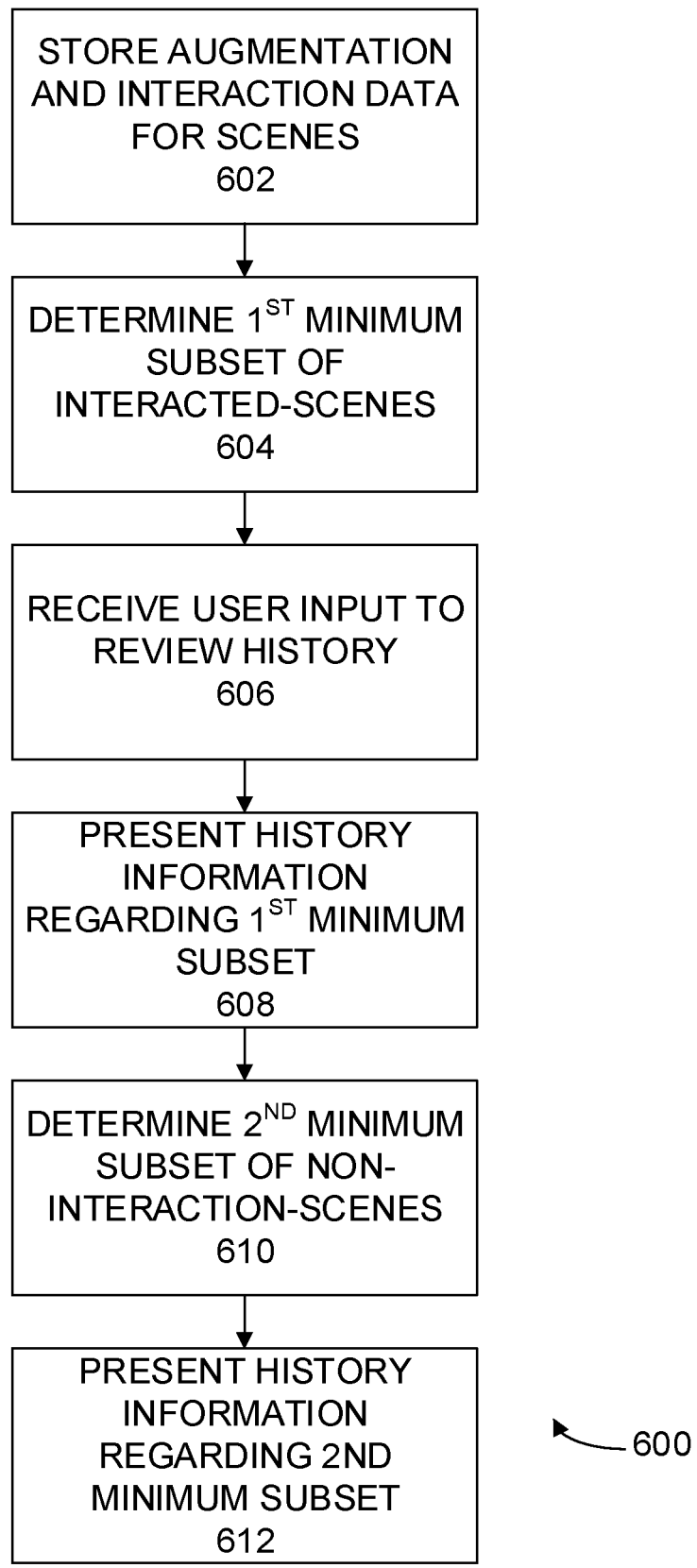
FIG. 6 depicts a method of displaying AR history, in accordance with some embodiments.

FIG. 6 depicts a method 600 of displaying AR history, in accordance with some embodiments. The method 600 includes storing augmentation and interaction data for scenes at 602, determining a first minimum subset of interacted-scenes at 604, receiving a user input to review history at 606, presenting history information regarding the first minimum subset at 608, determining a second minimum subset of non-interaction-scenes at 610, and presenting history information regarding the second minimum subset at 612.

At 602, information regarding a first plurality of scenes encountered by a user is stored. The information includes data regarding augmentations that were presented in each scene, and data regarding augmentations that were interacted with by the user. At 604, a first subset of the first plurality of scenes is determined. The first subset may comprise a minimum size set of interacted-scenes in which all augmentations with which the user interacted are represented.

At 606, a user input is received to review the AR history. The user input may limit the scope of the history review to a time period, a geographic area, specific AR applications, and other searchable metadata, such as nearby friends, and the like. At 608, information is presented regarding the first subset of the first plurality of scenes comprising a minimum number of scenes in which all augmentations with which the user interacted are represented.

The method 600 may continue at 610 to further determine a second subset of the first plurality of scenes. The second subset of the first plurality of scenes may comprise a minimum size set of non-interacted-scenes in which all non-interacted augmentations of non-interacted-scenes are represented. Because the second subset only includes non-interacted augmentations from non-interacted-scenes, no scenes in the second subset are in the first subset of the first plurality of scenes. At 612, the second subset of the first plurality of scenes may be displayed to the user.

Summarizing and Organizing Historical Augmented Reality Data

Figure 7:
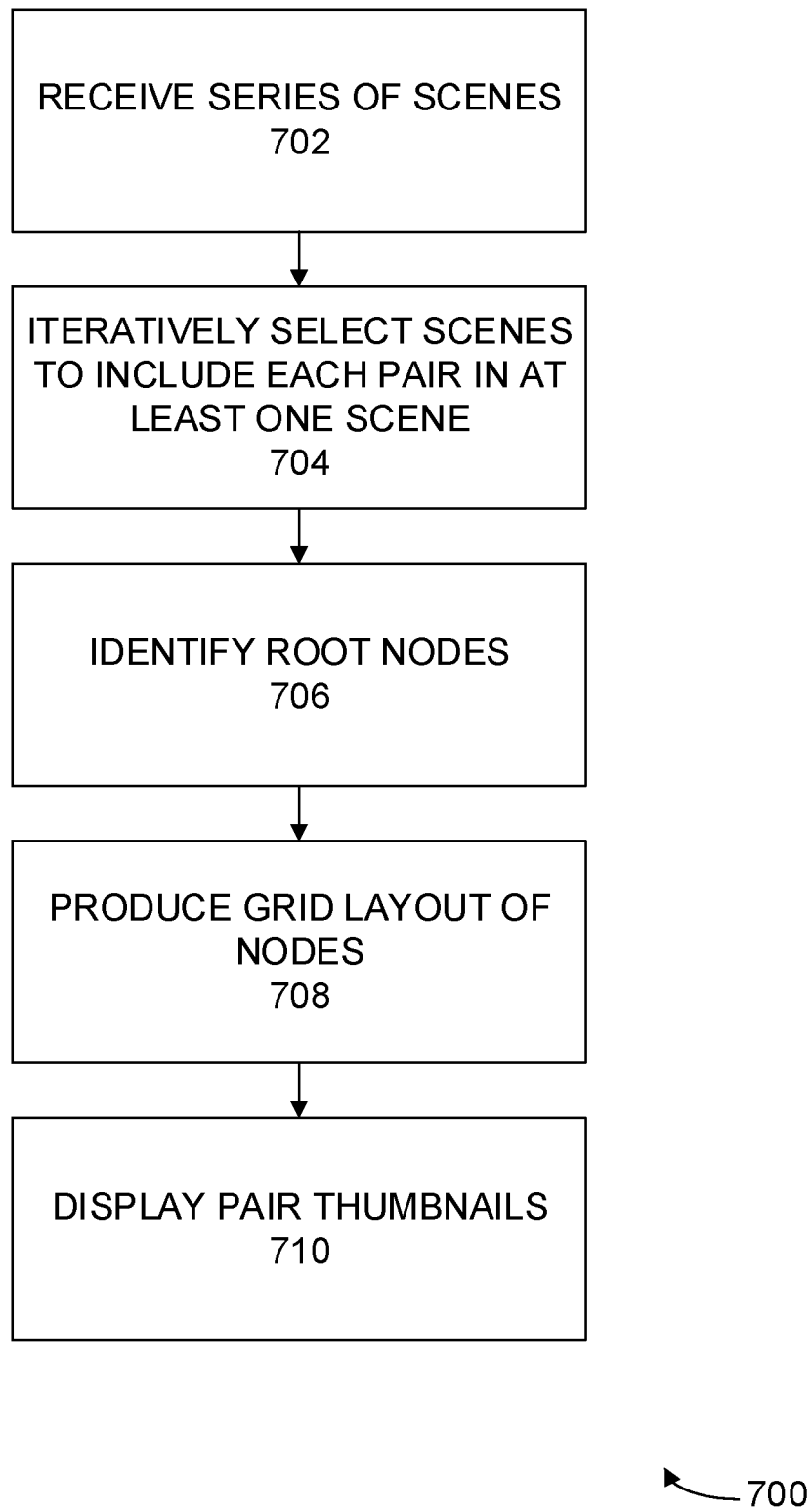
FIG. 7 depicts a method of selecting and organizing historical AR information, in accordance with some embodiments.

FIG. 7 depicts a method 700 of selecting and organizing historical AR information, in accordance with some embodiments. Method 700 includes receiving a series of scenes at 702, iteratively selecting scenes to include each pair in at least one scene at 704, identifying root nodes at 706, producing a grid layout of the nodes at 708, and displaying pair thumbnails at 710.

At 702, a series of scenes are received (for example as generally discussed above), each scene being associated with at least one pair. At 704, the received scenes in the series of received scenes are iteratively selected until each pair is included in at least one selected scene, preferring scenes that have a pair in common with a selected scene and introducing the greatest number of new pairs. In some embodiments, unlike method 100, no data regarding user interaction with a pair is received.

At 706, one or more root nodes are identified, each a central scene. In one embodiment, identifying the root nodes may comprise building from the received scenes an undirected weighted graph where nodes are scenes, edges link scenes with overlapping pairs, and edge weights are equal to the number of overlapping pairs. A maximum weight spanning forest of the graph may be determined by selecting a single root for each tree in the graph, where each root is a node of a tree that has a maximum aggregate weight of edges connected to it.

At 708, a grid-based layout is produced of the nodes, beginning separately from each root and proceeding in order of increasing number of edges from the root by placing thumbnails of the children of each current node in cells adjacent to the current node's cell. In some embodiments, two or more children of a node may be combined into one thumbnail, and in some embodiments likewise combining children of the combined children, and so on. In other embodiments, user interaction is supported to temporarily display combined children separately after making space by hiding other nodes.

At 710, pair thumbnails (e.g., thumbnail images representative of a given pair) that are common between a parent and its children may be displayed. In some embodiments, there may be a list of pairs associated with a received scene that is a complete list of pairs whose real-life objects appear in that scene. In some embodiments, a spanning forest comprising two or more trees may be determined, a grid-based layout for each tree in the forest produced, and the layouts for each tree separated from each other by a gap of at least one vacant cell.

Figure 8:
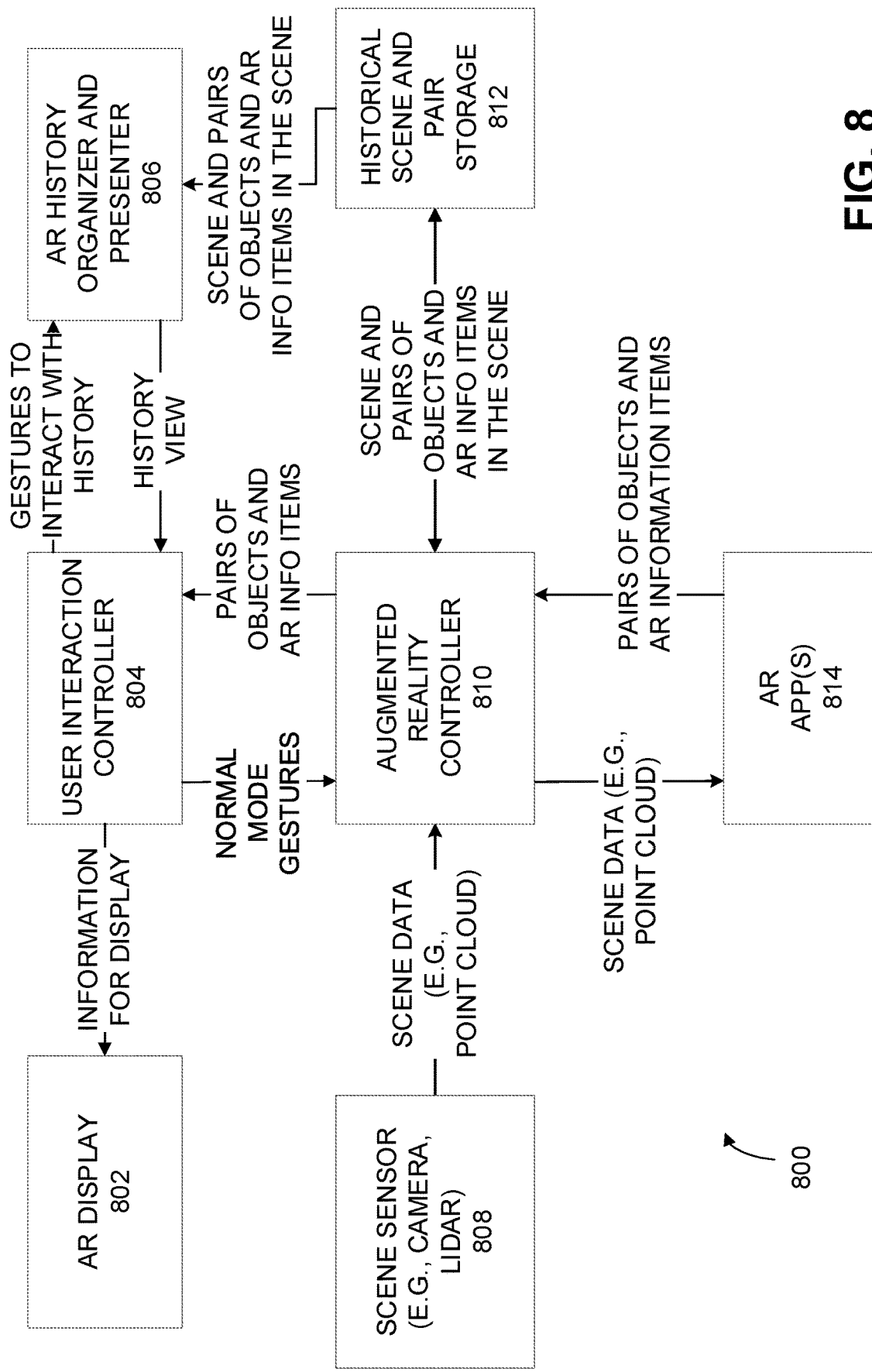
FIG. 8 depicts a system architecture, in accordance with some embodiments.

FIG. 8 depicts a system architecture of a system 800, in accordance with some embodiments. The system 800 includes an AR display 802, a user interaction controller 804, an AR history organizer and presenter 806, a scene sensor 808, an AR controller 810, a historical scene and pair store 812, and AR applications 814. The components of the system 800 may act similarly to the components of the system 200 of FIG. 2, and may perform the method 700. As understood by those of skill in the art, the components of systems 200 and 800 may be combined to carry out various combinations of different embodiments disclosed herein.

One or more scene sensors 808 may capture information about a scene (e.g., scene data). In some embodiments, the scene sensors may comprise a still camera or a video camera, and a scene may be represented by one or more still images and/or by a clip of video. In some embodiments, the scene sensors may comprise a radar, LiDAR, or other similar sensors. In some embodiments, the information captured by the scene sensors may comprise a point cloud. In some embodiments, the scene sensors may also include a location sensor (e.g., GPS, compass, etc.). The scene sensor(s) 808 may communicate captured scene data to the AR controller 810.

AR applications 814 may comprise third party applications on the users AR device, and/or the like. These applications 814 may be configured to receive at least some information about a given scene (e.g., scene data captured by the scene sensor(s) 808, including location data where appropriate) and return pairs of real-life objects and AR information items. In some embodiments, a real-life object (identified using, for example, its location coordinates, image, and boundary) may be "tagged" with a unique identifier. This unique identifier may permit the system to identify the same real-life object in different scenes. In some embodiments, the system may maintain or access a database of unique identifiers. In some embodiments, the unique identifiers may be determined by looking up a real-life object in an image database (e.g., different views of a building would be directed to the same database entry and identifier). An AR information item may provide information related to the associated real-life object, and describe how to render that information in an AR display 802.

In some embodiments, the AR controller 810 may not receive explicit pairs of real-life objects and AR information items, but rather sufficient information to obtain a specific pair of a real-life object and an AR information item. For example, an AR application 814 may receive scene data from the AR controller 810 and return a link to an AR information item (e.g., URL) and a coordinate location in the given scene. From such information, the AR controller 810 may retrieve the AR information item by following the link, and identify the real-life object by analyzing the scene data (e.g., object identification by image processing and selecting object at the coordinates).

In some embodiments, scenes may be captured by the AR controller when, for a given segment of scene data, at least one pair of a real-life object and an AR information item is received by the AR controller, such as from one or more AR applications. In some embodiments, new scenes are only captured when there is a change in pairs presented to the user by the AR system. In some embodiments, there is a minimum time period between captured scenes (e.g., 30 seconds, 1 minute, 10 seconds, etc.). In some embodiments, scene data is only captured when a user has settled their view on a scene for a threshold time period (e.g., 5 seconds, 10 seconds, 3 seconds, 20 seconds, etc.). In some embodiments, scene data is captured after a threshold movement by the user is detected (e.g., user turns 90 degrees, user walks 10 meters, etc.).

The AR display 802 presents an augmented view to the user. It may also present a grid of scenes representing historical data to the user.

The user interaction controller 804 controls the AR display 802, and provides detected user gestures to various modules in the system. For example, detected AR related gestures are presented to the AR controller 810 and history related gestures are provided to the AR history organizer and presenter 806. The user interaction controller 804 determines when the user enters or exits the history mode. In some embodiments, the user interaction controller 804 enters the history mode upon request from the user or unilaterally based on determining that the user was confused about his or her surroundings or apparently about some AR information item previously seen. Different interactions may be detected, such as a user dwelling on or otherwise indicating an AR information item, based on detection of eye gaze, gestures, speech, and/or the like by the user interaction controller 804. A user may have read the AR information item, seen a video, opened a link via a gesture, and/or the like to register a user interaction with a pair.

The AR controller 810 selects and selects AR information items to present to the user. Additionally, the AR controller 810 provides scenes to the historical scene and pair storage 812.

The AR history organizer and presenter 806 retrieves the historical scenes, pairs, and user interactions from the historical scene and pair store 812. It also determines a subset of historical scenes that include the pairs that were presented to the user, organizes the subset of historical scenes into a structure based on thumbnails that relate to each other, prepares thumbnails for presenting the historical scenes, and supports user interaction with the historical scenes.

In some embodiments, two or more pairs may be substantially similar (e.g., real-life objects are different entrances for a museum or store but AR objects are the same; etc.). In such embodiments, the system may determine that the two or more pairs are sufficiently similar such that only one of the two or more pairs can be presented to the user in a compact historical view. In some embodiments, the real-life object portions of two pairs having the same AR portion may be sufficiently similar for the system to treat the pairs as being the same for historical review purposes. In some embodiments, the AR portions of two pairs having the same real-life object portion may be sufficiently similar for the system to treat the pairs as being the same for historical review purposes. In some embodiments, two pairs may not share either a real-life object portion or an AR portion, but both portions may be sufficiently similar for the system to treat the pairs as being the same for historical review purposes.

The various modules and components of the system 800 may be implemented on a user device or a cloud service, in whole or in part.

Figure 9:
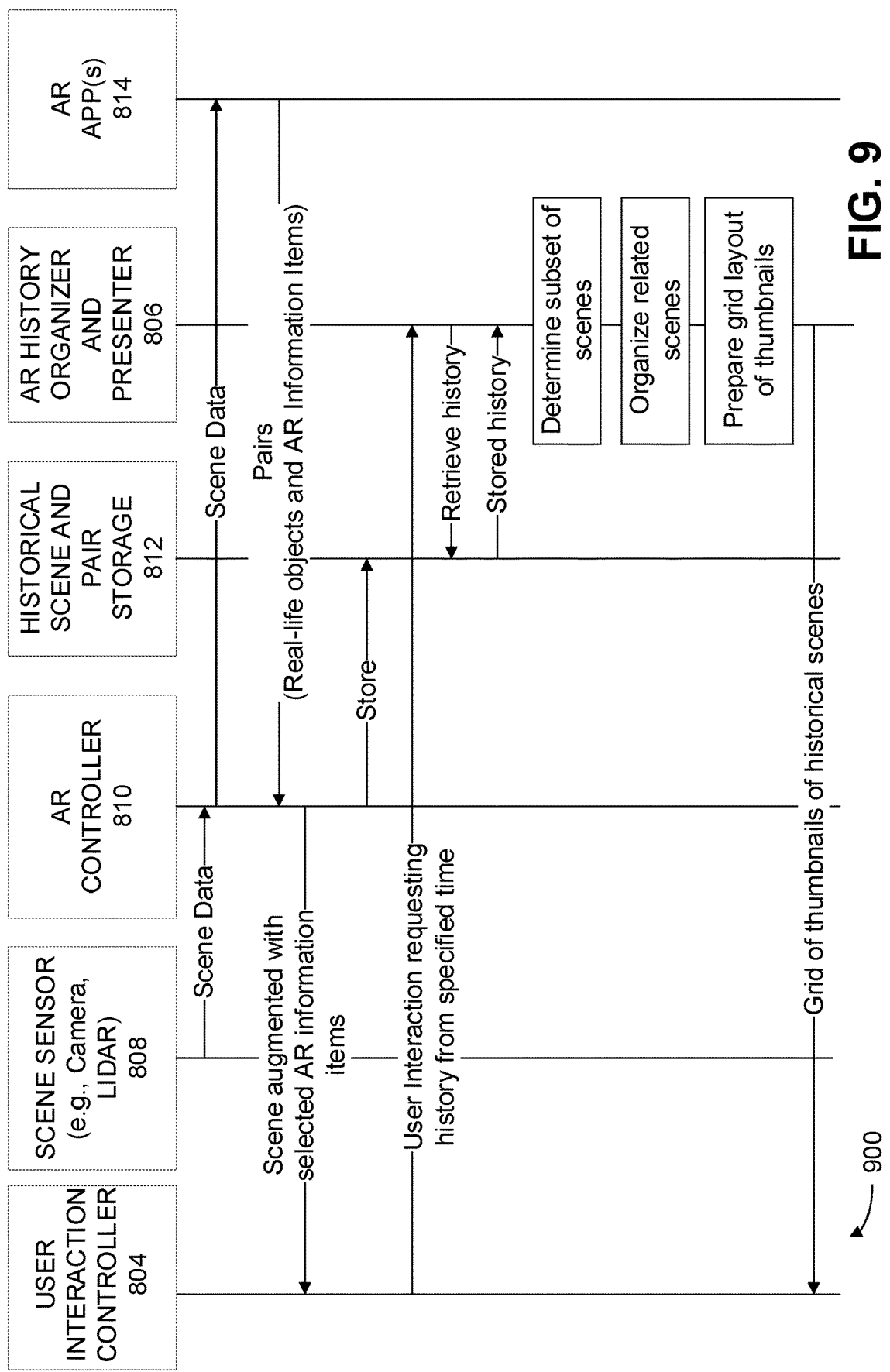
FIG. 9 depicts a sequence diagram depicting interactions between different modules, in accordance with some embodiments.

FIG. 9 depicts a sequence diagram for a sequence 900 of interactions between the components of the system 800 of FIG. 8.

In the sequence 900, the scene sensor 808 provides scene data to the AR controller 810, which forwards the scene data to the AR application 814. The AR application 814 provides pairs of real-life objects and AR information items to the AR controller 810. The AR controller 810 provides the user interaction controller 804 with data for the AR display 802 to display an augmented scene with the selected AR information items. The AR controller 810 also provides historical scenes and pairs to the historical scene and pair storage 812. The user interaction controller 804 determines, based on a detected user interaction, to display a history of AR scenes to the user and requests the history from the AR history organizer and presenter 806, which responsively requests and receives the requested history from the historical scene and pair storage 812. The AR history organizer and presenter 806 determines a subset of scenes, organizes related scenes, and prepares a grid layout of the thumbnails. The grid of thumbnails is provided to the user interaction controller 804 for presentation to the user by the AR display 802.

FIGS. 10-13 illustrate some aspects of the method 700 discussed in conjunction with FIG. 7. The received scenes S1-S20 and their respective present pairs A-T are shown below in Table 5, and represent the scenes received at 702 of method 700. For example, if scene 400 of FIG. 4 correlates to the scene S1 in Table 5, then the scene includes the pairs A and B with each pair comprising a real-life object and an AR information item for that object.

TABLE 5

| Received Scenes and Pairs | | | | | | | | | |
|---|---|---|---|---|---|---|---|---|---|
| Scene | S1 | S2 | S3 | S4 | S5 | S6 | S7 | S8 | S9 | S10 |
| All pairs | A, B | A, E | B, C, D | F, G, H | A, C, H, O | I | A, D, E, F, I | L, M | D, E, F, I, L, M, N | I, O |
| Scene | S11 | S12 | S13 | S14 | S15 | S16 | S17 | S18 | S19 | S20 |
| All pairs | I, P, Q | A F, P | P, Q | R | D, E, J, S | R, S, T | B, D, E, K, S | K | A, E | B, F, G, H, K |

FIG. 10 depicts the results of a series of iterations of scene selections, in accordance with some embodiments. In particular, FIG. 10 depicts the results of six iterations of scene selections of 704 of the method 700. Here, scene S9 is the first scene selected with pairs D, E, F, I, L, M, and N being included by the selection. In the second iteration, scene S20 is selected, and pairs B, G, H, and K are now also included from the scene S20. Pair F was previously included from scene S9. The process of identifying scenes to select comprises selecting candidate scenes. The candidate scenes are all unselected scenes that include at least one pair included in the currently selected scenes, if any, or all unselected scenes. Otherwise, the candidate scene with the greatest number of pairs not included among those currently selected is chosen. Thus, when selecting scenes, scenes that overlap in their pairs are preferentially selected. If no such scene exists, then all scenes that would contribute at least one pair may be considered. This may occur if the scenes are not contiguous, if the user goes through a region without receiving AR pairs, or if the user turns off the AR system and resumes use after a time gap.

In some embodiments, selecting a scene comprises selecting a scene that adds the greatest number of pairs that are not already included in the previous selections. Thus, the overall number of selected scenes is reduced, and fewer scenes are displayed in the user history.

FIG. 11 depicts an embodiment of displaying nodes in a layout 1100 that includes the selected scenes, with connections depicting pair overlaps between the scenes. Among the overlapping pairs, there is one central scene, scene S9. For each set of scenes that are disjoint with respect to the pairs they contain (if more than one set of scenes), there will be a different central scene. In some embodiments, a graph is constructed by a set of nodes, a set of edges (each edge connects two nodes), and a numeric weight on each edge. Using the display layout of nodes 1100 as an example, two nodes for scenes S11 and S9 are connected via an edge indicating one pair (the pair I) is in common between those two nodes. In the depicted graph, each selected scene becomes a node, there is an edge between any two nodes that have at least one pair in common, and the weight of an edge between two nodes is the number of pairs in common between those nodes.

For a connected graph, a spanning tree—a subgraph that contains all of its nodes and just enough edges so that the subgraph is connected—may be determined. When a graph is disconnected, as may occur when the selected scenes fall into two or more partitions that do not have pairs in common, a single spanning tree may not exist because there is no way to connect all of the nodes. In such scenarios, a spanning forest, comprising multiple trees, may be found. A maximum weight spanning forest is one in which the roots of each tree is selected such that the aggregate weight of the trees is maximized. The maximum weight spanning forest may be found by using existing algorithms, such as Kruskal's algorithm and the like, for each disconnected subgraph.

FIG. 11 further depicts aspects of identifying root nodes per 708 of the method 700. For each tree, identifying a root node comprises identifying a node that has the highest aggregate weight of edges connected to it. If more than one such node exists, the scene with the largest number of pairs in the associated scene may be selected. If more than one node exists that has the same largest number of pairs, various procedures may be used to break a tie, from choosing randomly, reviewing other metadata or weighting factors, and/or the like. In the example depicted in FIG. 22, scene S9 is selected as the root node with the highest aggregate weight of edges, with an aggregate weight of four.

FIGS. 12A-12C depict steps in producing a grid-based layout, as at 708 of FIG. 7, in accordance with some embodiments. To produce a grid-based layout, the process may proceed tree by tree, or node by node, for each tree in the maximum weight spanning forest. In some embodiments, a grid of cells overlaid on a geometric plane is displayed to the user. The grid may be unbound in four directions, and the root cell may serve as the origin of the grid, i.e., with row and column coordinates each with a value of zero, represented by "<0, 0>", with the first 0 representing the column, and the second 0 representing the row. Each cell in the grid has row and column coordinates relative to the root cell, with negative rows below and positive rows above; negative columns to the left and positive columns to the right. In some embodiments, the coordinate system may be changed, listing first the row and then the column, and the directions of negative and positive numbers reversed.

Two cells are adjacent to each other if their row and column coordinates each differ by no more than one, thus each cell has eight cells adjacent to it. Two cells are closely adjacent to each other if they are adjacent and either their row or their column coordinates are the same. Thus, each cell has four cells that are closely adjacent to it. A second cell is outward from a first cell if the maximum of the magnitudes of the second cell's row and column coordinates is greater than the maximum of the magnitudes of the first cell's row and column coordinates. Outward adjacent cells increase by magnitude by one each time.

Producing the grid comprises expanding from the root cell at <0, 0> and proceeding outward in rings around it. In a first example, the first ring around the origin has eight cells, located at: <−1,−1>, <−1,0>, <−1,1>, <0,−1>, <0,1>, <1,−1>, <1,0>, <1,1>. The second ring around the origin has 16 cells, located at: <−2,−2>, <−2,−1>, <−2,0>, <−2,1>, <−2,2>, <−1,−2>, <0,−2>, <1,−2>, <−1,2>, <0,2>, <1,2>, <2,−2>, <2,−1>, <2,0>, <2,−1>, <2,2>.

To produce the grid-based layout, a thumbnail corresponding to the root node is placed at the origin, as depicted in FIG. 12A. Iteratively, sets of current nodes are considered in increasing number of edges from the root in the current spanning tree, beginning from the root itself with zero edges from the root as depicted in FIGS. 12B and 12C. That is, first consider all nodes that are one hop from the root, then all nodes that are two hops from the root, and so on. Each current node already has been placed as a thumbnail on the grid when this is performed. The same thumbnail may contain more than one of the current nodes.

For each set of current nodes (all nodes having the same number of edges to the root), in one embodiment a method comprises: for each previously placed thumbnail, corresponding to one or more current nodes, determine the union of the sets of children of its current nodes; in a round robin fashion, place the first child of each current thumbnail, if any, in a vacant closely adjacent, outward cell for each current thumbnail; and continue placing, in a round robin fashion, children of each current thumbnail. If an adjacent cell is vacant, then use that cell, else, combine the child into an adjacent cell that already contains a child of the current thumbnail, preferentially combining with those previously occupied cells that have the fewest current nodes in them.

Figures 13, 14:
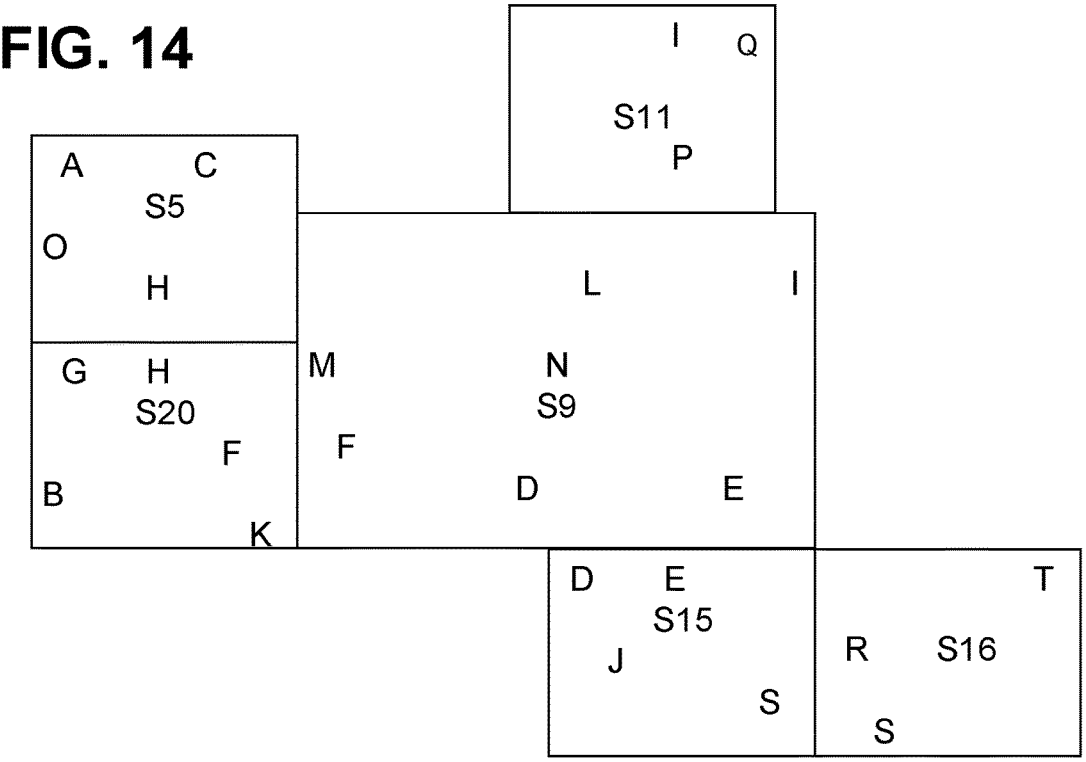
FIG. 13 depicts a grid-based layout annotating pairs that are common between parent and child thumbnails, in accordance with some embodiments.
FIG. 14 depicts a second grid-based display, in accordance with some embodiments.

FIG. 13 depicts a grid-based layout annotating pairs of the grid-based layout of thumbnails of FIG. 12C, with added annotations for pairs in common between the parent and child thumbnails. For example, pair H is annotated with the symbol "#" in the thumbnails of scenes S5 and S20 to indicate they are in common. In other embodiments, visual features are used to indicate pairs that are related to each other. Such visual features may include outlines or halos of matching colors, dashes, boldness, and the like. For example, pair H may be displayed as a red dashed outline where it occurs, and pair S may include a yellow halo above it when it appears in the history view, as two different examples. In another embodiment, when a current node has a vacant adjacent cell that is not outward from the current node and the current node has a child node that is a leaf, the child is placed in a non-outward cell. In another embodiment, the root is displayed larger than the other nodes. In another embodiment, the distance between two thumbnails is used to determine where to place the thumbnail to reduce the overall thumbnail distance for a layout. In such an embodiment, the pair distance of a pair in two thumbnails is determine if the pair occurs in two thumbnails, the distance between the centroids of the real life objects in two occurrences of the pair. The thumbnail distance between two thumbnails is determined by the sum of the pair distances for all pairs common to these thumbnails.

FIG. 14 depicts a second grid-based display, in accordance with some embodiments. In particular, FIG. 14 depicts a grid-based display with the root, a thumbnail of scene S9 larger than the other thumbnails, and surrounding thumbnails placed so that the distance between their overlapping pairs is reduced. For example, the thumbnails for scenes S9 and S15 are at a close distance to each other for the pairs D and E, the thumbnails for the scenes S15 and S16 are close for the pair S, the thumbnails for the scenes S9 and S20 are close for the pair F, and the thumbnails for the scenes S20 and S5 are close for the pair H. In such an embodiment, the alignment of the thumbnails does not conform to a strict grid-based layout, with each scene within a defined cell, as depicted by the thumbnails for the scenes S9 and S11.

Figure 15:
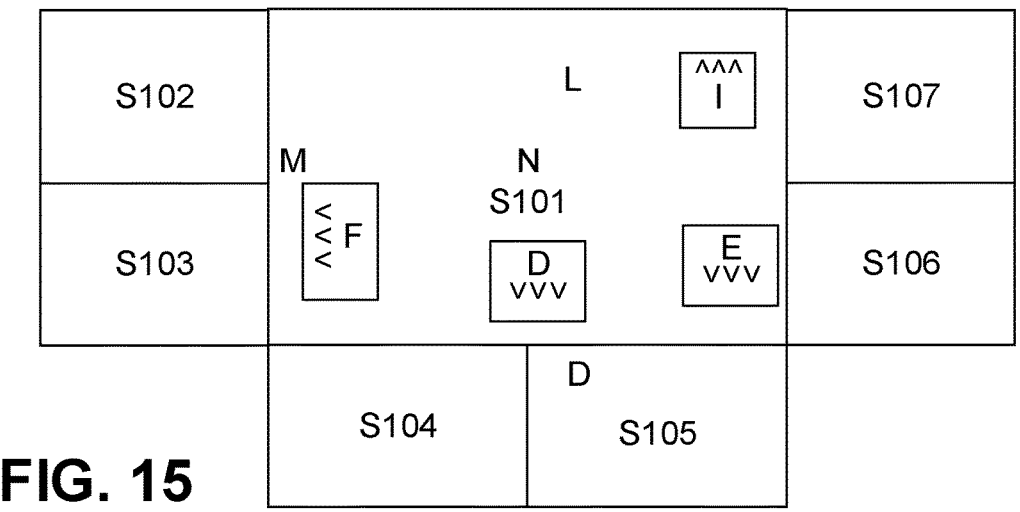
FIG. 15 depicts a grid-based display utilizing carets, in accordance with some embodiments.

FIG. 15 depicts a grid-based display utilizing carets, in accordance with some embodiments. In particular, FIG. 15 depicts a root scene S101 surrounded by children scenes S102 to S107. The root scene S101 includes pairs D, E, F, I, L, M, and N throughout the thumbnail of the scene. The pairs D, E, F, and I all include carets indicating that the pairs in the central thumbnail overlap with another thumbnail. When the user interacts with the caret, the central thumbnail shifts to the one where the overlapping pair occurs (in the indicated direction, if there are more than one such thumbnails).

Figure 16:
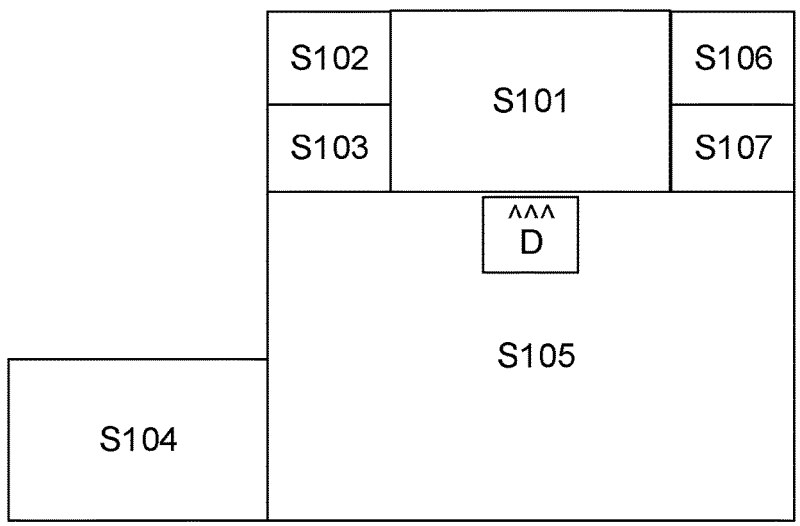
FIG. 16 depicts a view of a grid-based display after selecting a caret, in accordance with some embodiments.

FIG. 16 depicts a view of a grid-based display after selecting a caret, in accordance with some embodiments. In the view of FIG. 16, the user has previously selected pair D in the thumbnail of scene S101 depicted in FIG. 15. After the selection of pair D, the thumbnail of scene S105 becomes larger, and the other thumbnails of children scenes not directly adjacent to the thumbnail of scene S101 in FIG. 15 reduce in size. Here, the thumbnail of scene S104 may remain the same size in both FIGS. 15 and 16 before and after selecting of the pair D. After the selection, the pair D now appears in the thumbnail of scene S105 and close the thumbnail of scene S101, with the carets indicating upwards towards the direction of the thumbnail of scene S101, meaning that pair D is in common with the thumbnail of scene S101 above.

Figure 17:
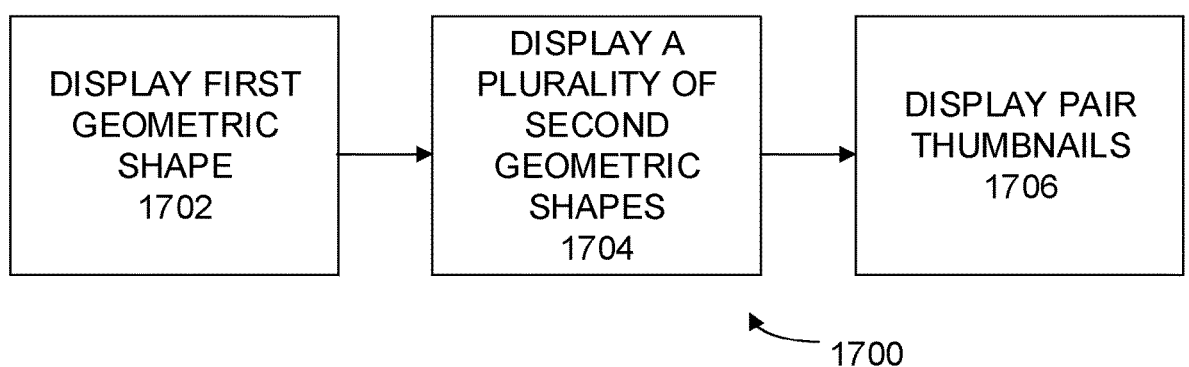
FIG. 17 depicts a method of summarizing and organizing historical augmented reality information, in accordance with some embodiments.
Figure 18A:
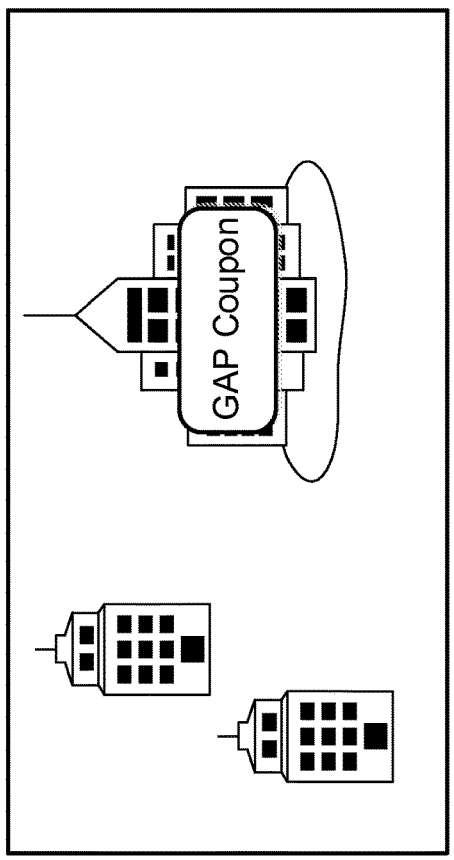
FIGS. 18A-18J depict exemplary AR scenes captured by a user over a period of time.
Figure 18B:
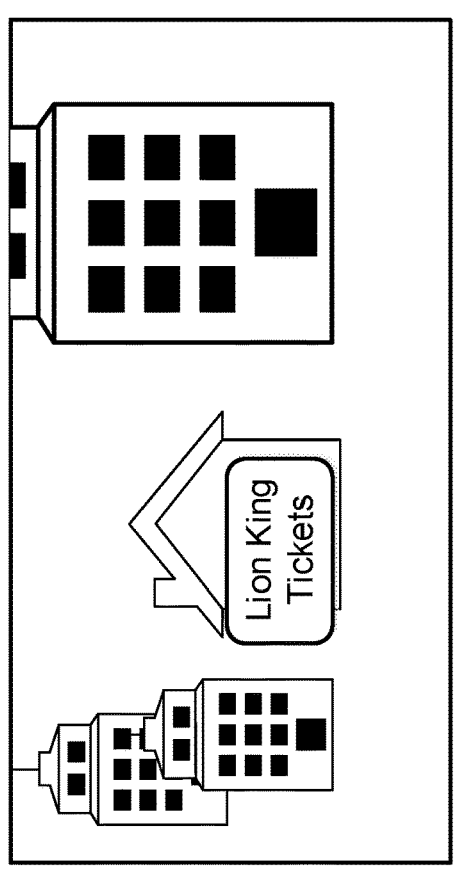
Figure 18C:
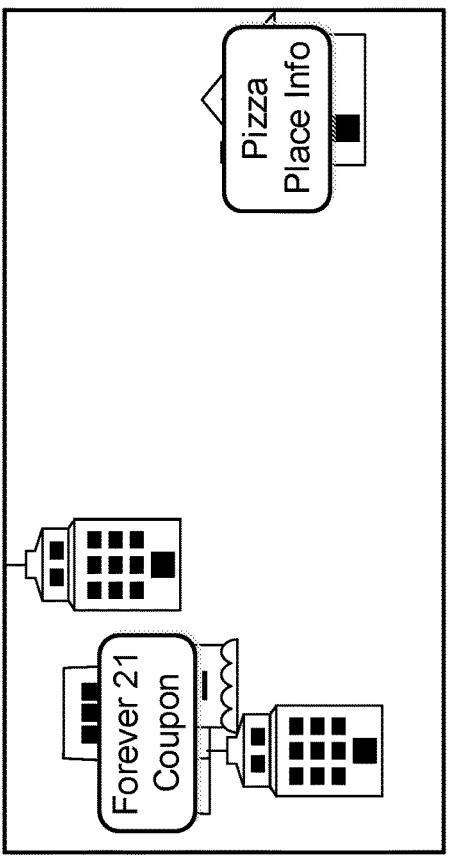
Figure 18D:
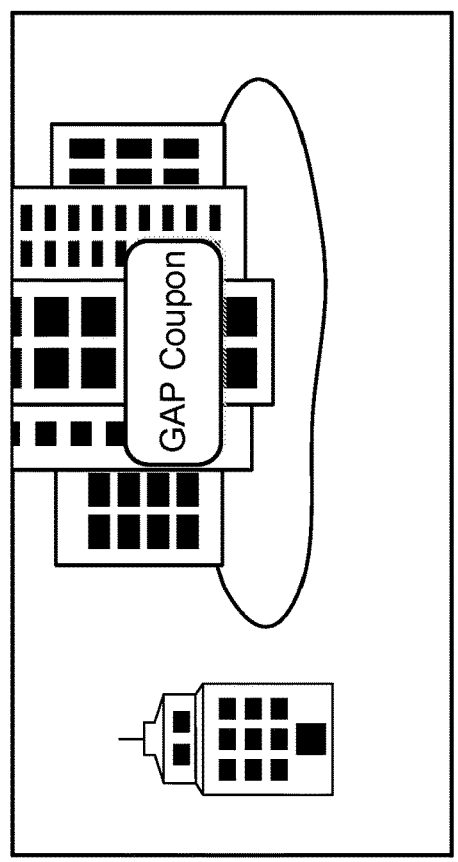
Figure 18E:
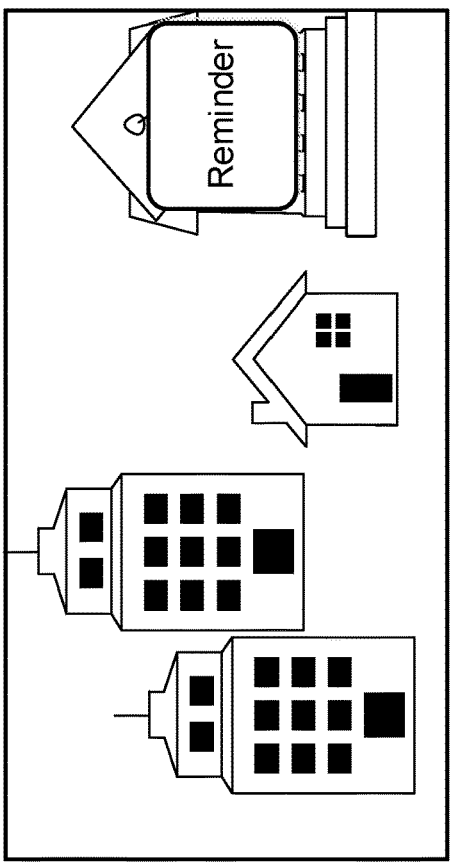
Figure 18F:
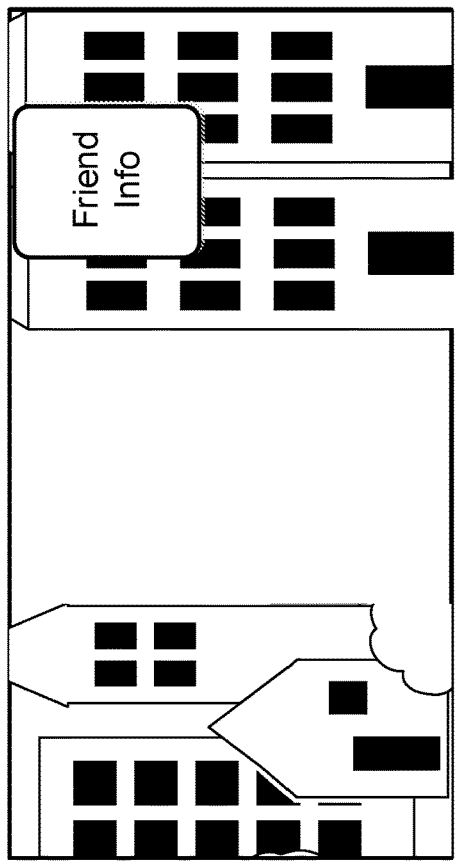
Figure 18G:
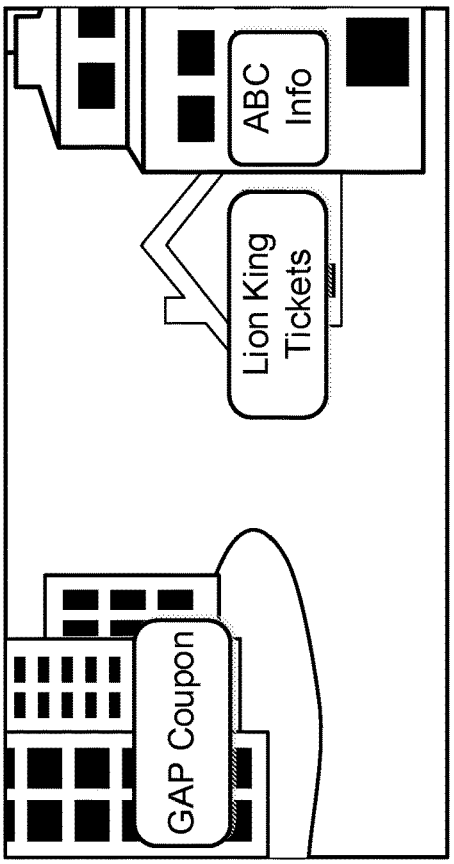
Figure 18H:
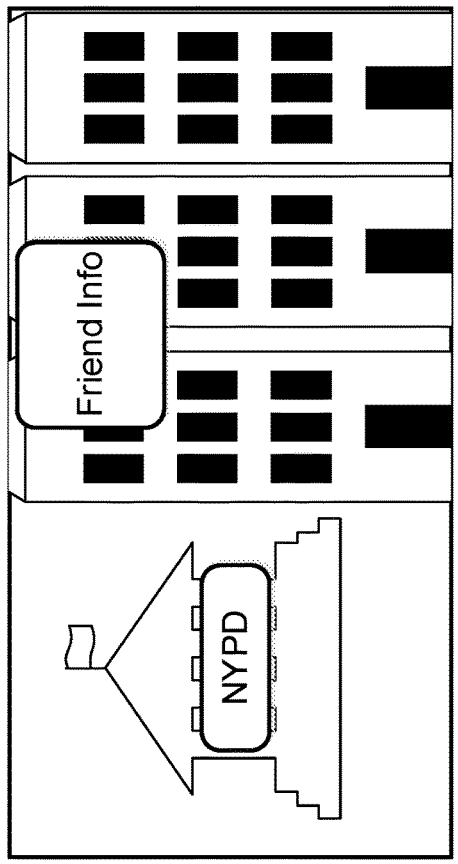
Figure 18I:
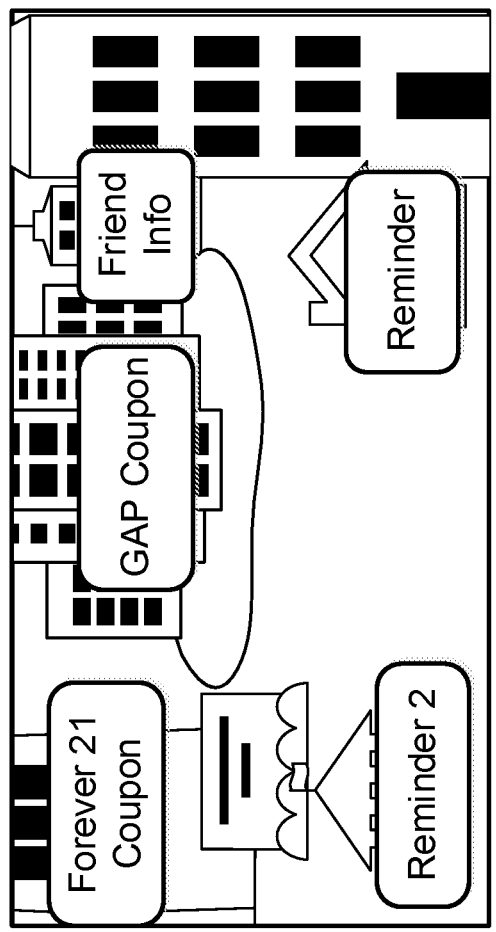
Figure 18J:
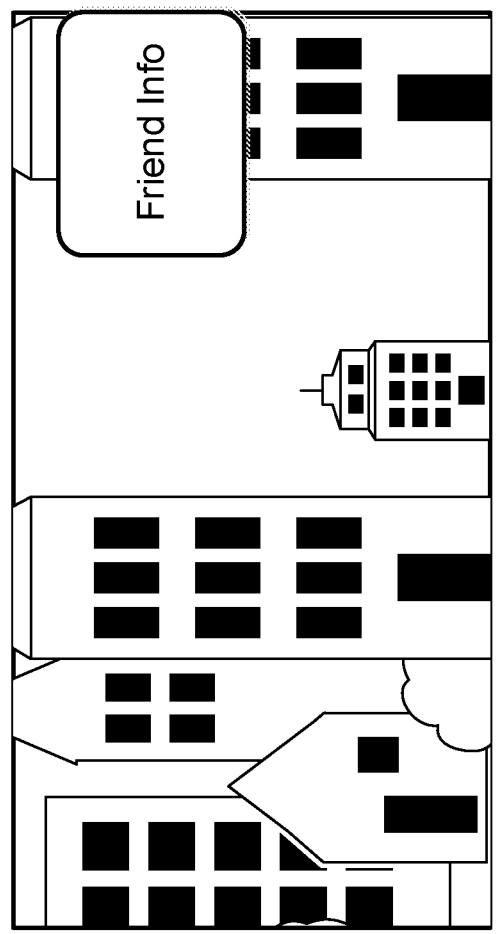

FIG. 17 depicts a method 1700 of summarizing and organizing historical augmented reality information, in accordance with some embodiments. Method 1700 includes displaying a first geometric shape at 1702, displaying a plurality of second geometric shapes at 1704, and displaying a pair of thumbnails at 1706.

Displaying a first geometric shape at 1702 comprises annotating the first geometric shape with information regarding the first scene in a first plurality of scenes. The information may be scene and pair information related to a historical AR presentation.

At 1704, displaying a plurality of second geometric shapes comprises at least one of the second geometric shapes being annotated with information regarding at least one additional scene of the first plurality of scenes. Each additional scene is a scene in which at least one object (e.g., an AR information item or augmentation) was presented which was also presented in the first scene, and each geometric shape in the plurality of second geometric shapes is arranged in the display such that it shares an edge with the first geometric shape. In some embodiments, the first plurality of scenes are scenes in which the user interacted with an AR augmentation or information item.

In some embodiments, scenes are selected for display based on a user's interaction with pairs in the scene, for example, as discussed in relation to methods 100 and 600 above. The selected scenes are displayed as a first geometric shape annotated with information regarding a first scene of the first subset of the first plurality of scenes comprising a minimum number of scenes in which all augmentations with which the user interacted are represented within the users view. A plurality of second geometric shapes is then displayed, annotated with information regarding a plurality of additional scenes of the first subset of the first plurality of scenes comprising a minimum number of scenes in which all augmentations with which the user interacted are represented. In some embodiments, each additional scene is a scene in which at least one augmentation with which the user interacted is also an augmentation with which the user interacted in the first scene; and each geometric shape in the plurality of second geometric shapes is arranged in the display such that it shares an edge with the first geometric shape. The first geometric shape and the plurality of second geometric shapes are presented to a user in an AR display as a summary and organization of historical AR scenes and associated pairs.

In some embodiments, each geometric shape may comprise at least a portion of a particular scene, such as where scenes are presented in overlapping fashion to associate common pairs between scenes.

In some embodiments, scenes or geometric shapes may not share an edge, but may be sufficiently close for the user to understand the spatial relationship between two scenes, such that the system may still display the scenes in relation to one another (e.g., if a layout of scenes similar to that of FIG. 13 was utilized).

In an exemplary scenario, an AR system user may spend a day walking around the downtown of a city. Over the course of their day, the AR system may collect various scenes, such as those illustrated in FIGS. 18A-18J. Various AR information items are present in the different scenes, including reminders, coupons, offers, details, and/or the like. In one scenario, the user may have interacted with each of these AR objects.

Figure 19:
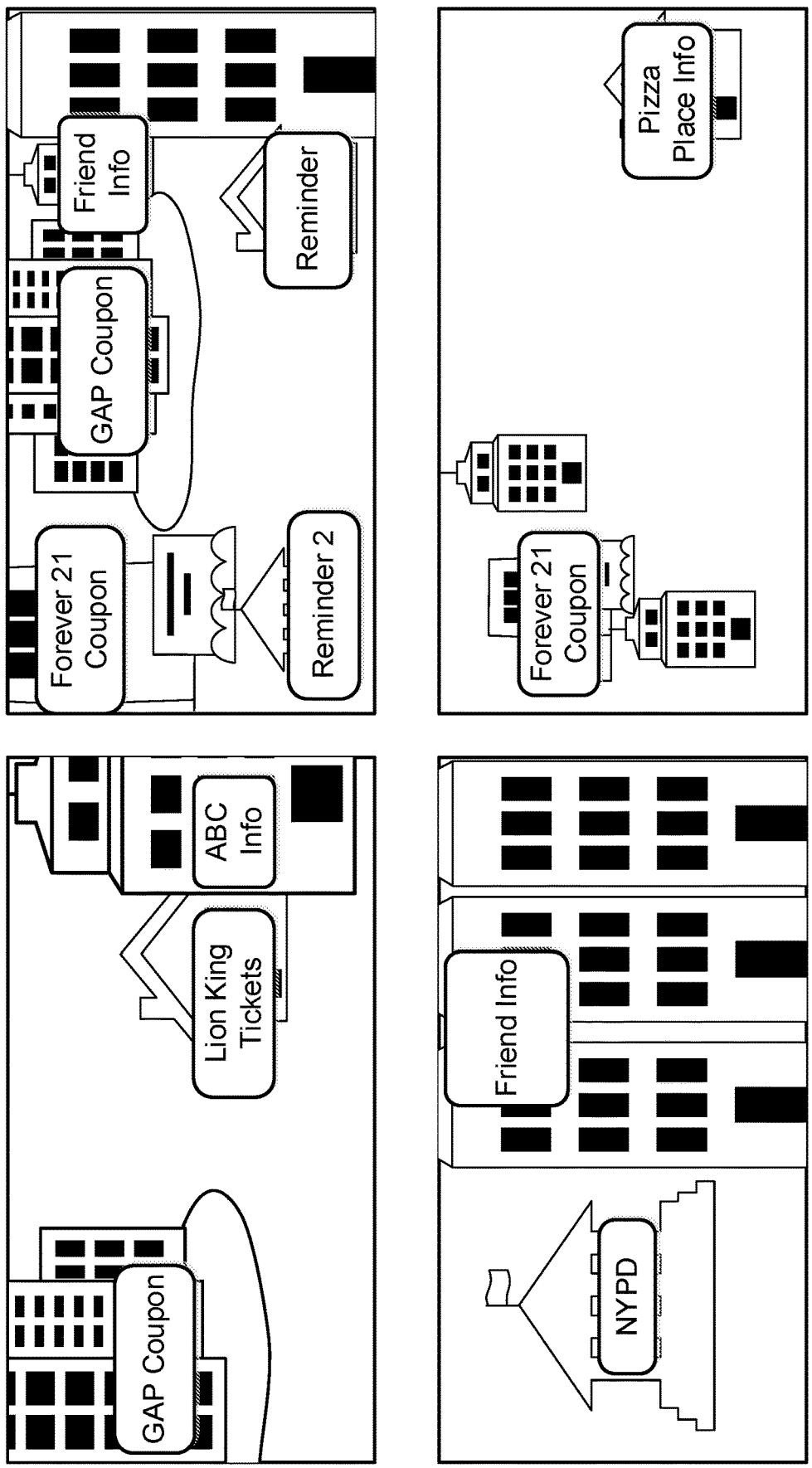
FIG. 19 depicts an exemplary compact historical view of the scenes of FIGS. 18A-18J.

In accordance with a method as set forth above, the captured scenes may be analyzed and a compact historical view presented that shows all AR information items that were presented to the user. FIG. 19 illustrates the minimum set of scenes from the scenes of FIGS. 18A-18J in a compact historical view that includes all of the AR information items presented to the user.

Figure 20:
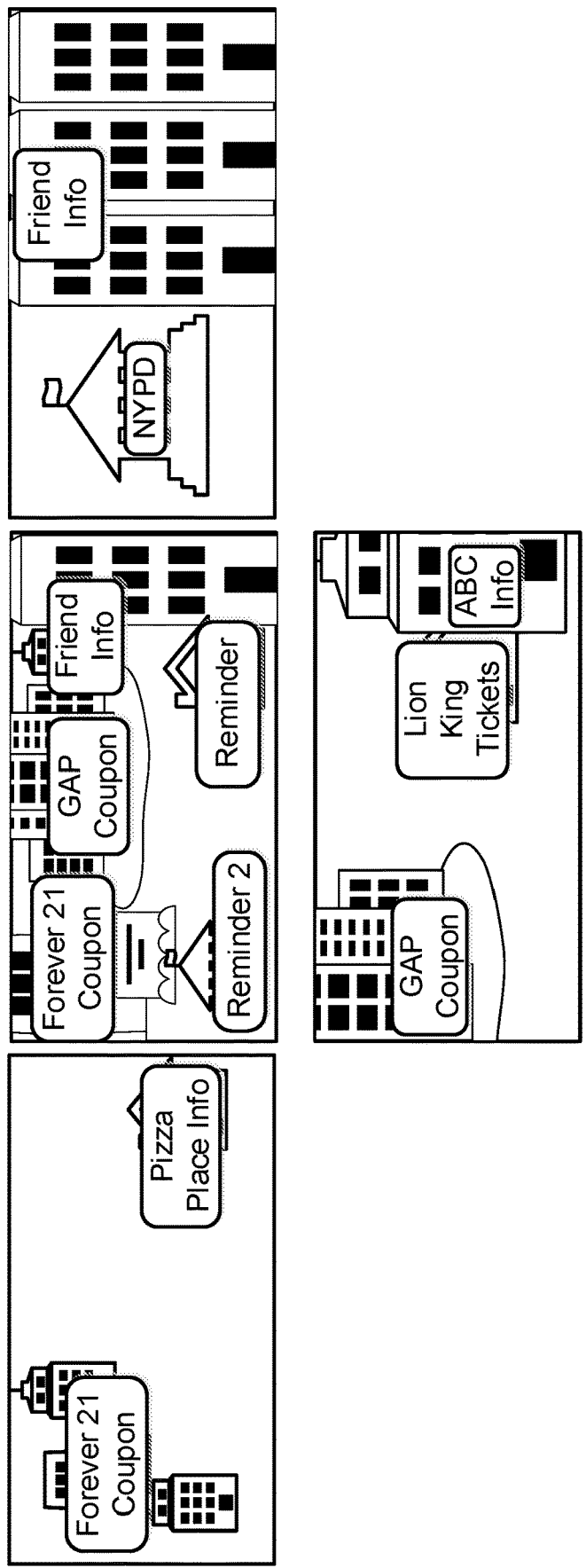
FIG. 20 depicts an exemplary grid-based layout of a compact historical view of the scenes of FIGS. 18A-18J.

In accordance with another method as set forth above, as shown in FIG. 20, the captured scenes may be analyzed and the system may generate and display a grid-based layout of the minimum set of the scenes that includes all of the AR information items presented to the user over the course of the day. The layout may organize the scenes of the minimum set such that scenes with shared pairs are displayed next to each other.

In one embodiment, there is a method for providing information for review by an augmented reality (AR) user, comprising: storing information regarding a first plurality of scenes encountered by the user, the information comprising information regarding augmentations presented in each scene and augmentations with which a user interaction was detected; determining a first subset of the first plurality of scenes comprising a minimum number of scenes in which all augmentations with which the user interacted are represented; and responsive to input from the user related to review of historical AR information, presenting information regarding the first subset of the first plurality of scenes comprising a minimum number of scenes in which all augmentations with which the user interacted are represented. The method may also further comprise: determining a second subset of the first plurality of scenes comprising a minimum number of scenes in which the set of augmentations with which the user did not interact that are not in the first subset of the first plurality of scenes; and presenting information regarding the second subset of the first plurality of scenes comprising a minimum number of scenes in which the set of augmentations with which the user did not interact that are not in the first subset of the first plurality of scenes. In one embodiment, there is a system comprising a processor and a non-transitory computer-readable medium storing instructions operative when executed to perform any combination of the above method.

In one embodiment, there is a method for presenting historical augmented reality (AR) information to a user, comprising: receiving a series of scenes, each scene being associated with a list of at least one pair, and a sublist of zero or more interacted pairs; producing a first subset of interacted scenes that together include every interacted pair and zero or more non-interacted pairs, wherein producing the first subset comprises: i) associating with each interacted scene the corresponding set of interacted pairs; ii) producing a first minimum set cover from the first set of sets of interacted pairs; and iii) mapping the set cover to a corresponding first minimum set of interacted scenes; producing a second subset of scenes that include all non-interacted pairs not contained in the first subset of interacted scenes, wherein producing the second subset comprises: i) associating with each scene the corresponding set of non-interacted pairs; ii) removing from each set of non-interacted pairs any pairs that occur in the first subset of interacted scenes; iii) producing a second minimum set cover from the set of sets of non-interacted pairs; and iv) mapping the set cover to a corresponding second minimum set of scenes; forming the final set of scenes as the union of the first and second subsets; and displaying the scenes in the final set of scenes. The method may also include wherein receiving a series of scenes comprises receiving chronological data regarding the scenes and displaying the scenes comprises displaying the scenes in a reverse chronological order. The method may also include wherein at least one scene in the series of scenes is an interacted scene. The method may also include wherein associating with each interacted scene the corresponding set of interacted pairs comprises forming a set of interacted pairs. The method may also include wherein associating with each scene the corresponding set of non-interacted pairs comprises forming a set of sets of non-interacted pairs. In one embodiment, there is a system comprising a processor and a non-transitory computer-readable medium storing instructions operative when executed to perform any combination of the above method.

In one embodiment, there is a method comprising: receiving a set of augmented reality (AR) scenes, at least one scene in the set of AR scenes having a pair of detected real-life objects and an AR augmentation for the real-life object; determining a first subset of interacted AR scenes from the received set of AR scenes, each scene in the first set comprising a pair a user interacted with; determining a second subset of non-interacted AR scenes from the received set of AR scenes, wherein no scenes in the second subset are in the first subset; combining the first and second subsets into a final set; and displaying the final subset on an AR device. The method may also include wherein determining the first subset of interacted AR scenes comprises determining a minimum set cover. The method may also include wherein determining the second subset of non-interacted AR scenes comprises determining a minimum set cover. The method may also include wherein displaying the final subset on an AR display comprises generating a thumbnail of each scene in the final subset. The method may also include wherein the final subset is displayed on the AR scene in response to detecting an AR history request. The method may also further comprise receiving a user request to display the first subset and responsively stop displaying the final subset and displaying the first subset on the AR device. The method may also include wherein displaying the final subset on the AR device comprises displaying pairs on the associated scenes. The method may also include wherein the displayed pairs indicate user interaction with pairs user interaction has been detected. In one embodiment, there is a system comprising a processor and a non-transitory computer-readable medium storing instructions operative when executed to perform any combination of the above method.

In one embodiment, there is an augmented reality (AR) system for displaying augmented reality information about a real-world object in a users view comprising: an AR display configured to receive AR display data from an AR user interface (UI) controller; a scene sensor configured to detect AR scenes; a user interaction recognizer configured to detect user interaction with displayed AR information items and to detect user history requests; a historical scene and pair storage configured to store historical scene, pair, and pair interaction data; a processor; and a non-transitory computer-readable medium storing instructions that are operative, when executed on the processor, to perform the functions of: receiving a set of augmented reality (AR) scenes, at least one scene in the set of AR scenes having a pair of detected real-life objects and an AR augmentation for the real life object; determining a first subset of interacted AR scenes from the received set of AR scenes, each scene in the first set comprising a pair a user interacted with, and the first subset being a minimum set cover of interacted pairs; determining a second subset of non-interacted AR scenes from the received set of AR scenes, wherein no scenes in the second subset are in the first subset; and the second subset being a minimum set cover of non-interacted pairs; combining the first and second subsets into a final set; and displaying the final subset on an AR device. The system may also include wherein displaying the final subset on an AR display comprises generating a thumbnail of each scene in the final subset. The system may also include wherein the final subset is displayed on the AR scene in response to detecting an AR history request. The system may also include the set of functions further comprising receiving a user request to display the first subset and responsively stop displaying the final subset and displaying the first subset on the AR device. The system may also include wherein displaying the final subset on the AR device comprises displaying pairs on the associated scenes. The system may also include wherein the displayed pairs indicate user interaction with pairs user interaction has been detected.

In one embodiment, there is a method of presenting visual recorded information to a user, comprising: displaying a first geometric shape annotated with information regarding a first scene of a first plurality of scenes; and displaying a plurality of second geometric shapes annotated with information regarding a plurality of additional scenes of the first plurality of scenes such that: i) each additional scene is a scene in which at least one object was presented which was also presented in the first scene; and ii) each geometric shape of the plurality of second geometric shapes is arranged in the display such that it shares an edge with the first geometric shape. The method may also include wherein the at least one object is an augmentation presented by an AR system. The method may also include wherein the first plurality of scenes are scenes in which the user interacted with an AR augmentation. The method may also include wherein the first geometric shape and each of the second geometric shapes are thumbnails of an AR scene. The method may also include wherein the thumbnails comprise AR pairs. In one embodiment, there is a system comprising a processor and a non-transitory computer-readable medium storing instructions operative when executed to perform any combination of the above method.

In one embodiment, there is a method for providing information for review by an augmented reality (AR) user, comprising: storing information regarding a first plurality of scenes encountered by the user, the information comprising information regarding augmentations presented in each scene and augmentations with which a user interaction was detected; determining a first subset of the first plurality of scenes comprising a minimum number of scenes in which all augmentations with which the user interacted are represented; responsive to input from the user related to review of historical AR information, presenting information regarding the first subset of the first plurality of scenes comprising a minimum number of scenes in which all augmentations with which the user interacted are represented; displaying a first geometric shape annotated with information regarding a first scene of the first subset of the first plurality of scenes comprising a minimum number of scenes in which all augmentations with which the user interacted are represented within the users view; and displaying a plurality of second geometric shapes annotated with information regarding a plurality of additional scenes of the first subset of the first plurality of scenes comprising a minimum number of scenes in which all augmentations with which the user interacted are represented such that: each additional scene is a scene in which at least one augmentation with which the user interacted is also an augmentation with which the user interacted in the first scene; and each geometric shape of the plurality of second geometric shapes is arranged in the display such that it shares an edge with the first geometric shape. The method may also include wherein the at least one object is an augmentation presented by an AR system. The method may also include wherein the first plurality of scenes are scenes in which the user interacted with an AR augmentation. The method may also include wherein the first geometric shape and each of the second geometric shapes are thumbnails of an AR scene. The method may also include wherein the thumbnails comprise AR pairs. In one embodiment, there is a system comprising a processor and a non-transitory computer-readable medium storing instructions operative when executed to perform any combination of the above method.

In one embodiment, there is a method for selecting and organizing historical augmented reality (AR) information for display to a user, comprising: receiving a series of scenes, each scene being associated with a list of at least one pair; iteratively selecting a scene until each pair is included in at least one selected scene; identifying one or more root nodes, each a central scene comprising: i) building an undirected weighted graph from the selected scenes whose nodes are scenes, edges link scenes with overlapping pairs, and edge weights equal the number of overlapping pairs; ii) determining a maximum weight spanning forest of the graph; and iii) from each tree in the forest, selecting exactly one root as the node that has the highest aggregate weight of edges connected to it; producing a grid-based layout of the nodes beginning separately from each root proceeding in order of increasing number of edges from the root by placing thumbnails of the children of each current node in cells adjacent to the current node's cell; wherein iteratively selecting a scene until each pair is included in at least one selected scene comprises selecting scenes that have a pair in common with a selected scene and introduce the most new pairs; and showing the pairs that are common between the parent and child thumbnails. The method may also include wherein producing a grid-based layout comprises combining two or more children of the same current node into the same thumbnail and in such case combining children of the combined children. The method may also include wherein producing a grid-based layout comprises supporting a user interaction to temporarily display the combined children separately by making space by hiding other nodes. The method may also include wherein the list of pairs associated with a received scene is the complete list of pairs whose real life objects occur in the scene. The method may also include wherein when spanning the forest with two or more trees, the method further comprises producing a layout for each tree and placing the layouts separated from each other by a gap of at least one vacant cell. In one embodiment, there is a system comprising a processor and a non-transitory computer-readable medium storing instructions operative when executed to perform any combination of the above method.

In one embodiment, there is a method of displaying historical AR information, comprising: determining a grid-based layout of historical AR scenes by: i) selecting an AR scene to be the root scene based on the AR scene having a highest aggregate weight of connected AR pairs; ii) placing the root scene at a central point in a grid; and iii) determining a set of AR scenes to place adjacent to the root scene, the set of AR scenes having the highest number of pairs in common with the root scene; generating a thumbnail for each scene included in the grid-based layout; and displaying the thumbnails arranged per the grid-based layout of historical AR scenes to a user via an AR display. The method may also include wherein the thumbnails include presented AR pair information. The method may also include wherein displaying the thumbnails comprises annotating pairs that are in common with adjacent thumbnails. The method may also include wherein a thumbnail associated with the root scene is larger than adjacent thumbnails. The method may also further comprise, responsive to a user interaction with a displayed pair for an adjacent thumbnail, generating an updated grid-based layout with the adjacent thumbnail acting as an updated root scene. In one embodiment, there is a system comprising a processor and a non-transitory computer-readable medium storing instructions operative when executed to perform any combination of the above method.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for providing information for review by an augmented reality (AR) user, the method comprising:
storing a plurality of scenes viewed by an AR user;
storing for each of the plurality of scenes information identifying (i) any pairs of real-life objects and AR augmentations presented in the scene and (ii) any pairs in the scene with which the user interacted;
selecting from the stored plurality of scenes a first subset of scenes such that each pair with which the user interacted is presented in at least one scene in the first subset of scenes; and
responsive to an instruction from the user to review historical AR information, presenting to the user the selected first subset of scenes.

2. The method of claim 1, wherein each scene comprises an AR augmented image of a real-life environment viewed by the user.

3. The method of claim 1, wherein the first subset of scenes is further selected such that each pair with which the user interacted is presented in at least one scene in which the user interacted with that pair.

4. The method of claim 1, wherein the first subset of scenes is further selected such that the first subset of scenes comprises a minimum size subset of the stored plurality of scenes in which all pairs with which the user interacted are presented.

5. The method of claim 1, wherein pairs with which the user interacted are indicated in the presented first subset of scenes.

6. The method of claim 1, further comprising storing chronological data for each of the plurality of scenes, and wherein presenting to the user the selected first subset of scenes comprises presenting the selected first subset of scenes in a reverse chronological order.

7. The method of claim 1, further comprising selecting a first scene including at least one pair with which the user interacted, and wherein the first subset of scenes is selected such that each scene in the first subset has at least one pair in common with the selected first scene.

8. The method of claim 7, wherein presenting the selected first subset of scenes to the user comprises:
presenting the selected first scene; and
presenting at least a portion of each other scene in the selected first subset of scenes such that the presented at least portion of each other scene is adjacent to the presented selected first scene.

9. The method of claim 1, further comprising:
determining a set of pairs (i) with which the user did not interact and (ii) which are not presented in the selected first subset of scenes;
selecting from the stored plurality of scenes a second subset of scenes such that each pair in the determined set of pairs is presented in at least one scene in the second subset of scenes; and
responsive to the instruction to review historical AR information, presenting to the user the selected second subset of scenes.

10. The method of claim 1, wherein presenting to the user the first subset of scenes further comprises:
presenting to the user a first scene of the selected first subset of scenes; and
presenting to the user a plurality of other scenes of the selected first subset of scenes wherein each of the plurality of other scenes is a scene in which at least one pair is presented which is also presented in the first scene, and wherein each of the plurality of other scenes is presented such that it is adjacent to the presented first scene.

11. The method of claim 10, further comprising, responsive to a determination that the first scene and plurality of other scenes do not include all scenes of the selected first subset of scenes, presenting to the user a second scene of the first subset of scenes which is not included in the first scene and plurality of other scenes.

12. The method of claim 11, further comprising presenting to the user at least one additional scene of the first subset of scenes not included in the first scene, plurality of other scenes, and second scene, wherein the at least one additional scene is a scene in which at least one pair is presented which is also presented in the second scene, and wherein each of the at least one additional scene is presented such that it is adjacent to the presented second scene.

13. The method of claim 1, further comprising:
identifying one or more root nodes from the first subset of scenes by:
building an undirected weighted graph where nodes are scenes of the selected first subset of scenes, edges link scenes with overlapping pairs, and edge weights equal the number of overlapping pairs;
determining a maximum weight spanning forest of the graph; and
for each tree in the forest, selecting exactly one root, wherein the root is a node in said tree that has the highest aggregate weight of edges connected to it; and
wherein presenting the selected first subset of scenes comprises presenting a grid-based layout of the nodes generated by beginning separately from each root and proceeding in order of increasing number of edges from the root by presenting the children of each current node in cells adjacent to the current node's cell.

14. The method of claim 13, wherein when spanning the forest with two or more trees, further comprising producing a layout for each tree and placing the layouts separated from each other by a gap of at least one vacant cell.

15. The system of claim 1, wherein each scene comprises an AR augmented image of a real-life environment viewed by the user.

16. The system of claim 1, wherein the first subset of scenes is further selected such that each pair with which the user interacted is presented in at least one scene in which the user interacted with that pair.

17. The system of claim 1, wherein the first subset of scenes is further selected such that the first subset of scenes comprises a minimum size subset of the stored plurality of scenes in which all pairs with which the user interacted are presented.

18. The system of claim 1, wherein pairs with which the user interacted are indicated in the presented first subset of scenes.

19. The system of claim 1, further operative to store chronological data for each of the plurality of scenes, and wherein presenting to the user the selected first subset of scenes comprises presenting the selected first subset of scenes in a reverse chronological order.

20. A system comprising a processor and a non-transitory computer-readable storage medium storing instructions operative, when executed on the processor, to perform functions including:
- to store a plurality of scenes viewed by an AR user;
- to store for each of the plurality of scenes information identifying (i) any pairs of real-life objects and AR augmentations presented in the scene and (ii) any pairs in the scene with which the user interacted;
- to select from the stored plurality of scenes a first subset of scenes such that each pair with which the user interacted is presented in at least one scene in the first subset of scenes; and
- responsive to an instruction from the user to review historical AR information, to present to the user the selected first subset of scenes.

* * * * *